United States Patent [19]

Eerkens

[11] 4,082,633

[45] Apr. 4, 1978

[54] HIGH MASS ISOTOPE SEPARATION PROCESS AND ARRANGEMENT

[76] Inventor: Jozef Willem Eerkens, 1342 Lachman La., Pacific Palisades, Calif. 90272

[21] Appl. No.: 639,977

[22] Filed: Dec. 11, 1975

Related U.S. Application Data

[63] Continuation-in-part of Ser. No. 262,661, Jun. 14, 1972.

[51] Int. Cl.² .......................... B01J 1/10; B01K 1/00
[52] U.S. Cl. ............................ 204/157.1 R; 250/527
[58] Field of Search ............... 204/157.1 R, DIG. 11; 250/527

[56] References Cited

U.S. PATENT DOCUMENTS

| 3,719,454 | 3/1973 | Shang | 204/DIG. 11 |
| 3,740,552 | 6/1973 | Pressman | 204/DIG. 11 |

OTHER PUBLICATIONS

Ambartzumian et al., Applied Optics, vol. 11, No. 2, Feb. 1972, pp. 354–357.

*Primary Examiner*—Howard S. Williams
*Attorney, Agent, or Firm*—Don B. Finkelstein

[57] ABSTRACT

An isotope separation arrangement for separating a preselected isotope from a mixture of chemically identical but isotopically different molecules by either photon-induced pure rovibrational or vibronic selective excitation of the molecules containing the atoms of the isotope to be separated from a lower to a higher energy state, and a chemical reaction of the higher energy state molecules with a chemically reactive agent to form a chemical compound containing primarily the atoms of isotope to be separated in a physicochemical state different from the physicochemical state of the mixture of chemically identical but isotopically different molecules. The chemical compound containing the atoms of the isotope to be separated may be subsequently processed to obtain the isotope.

72 Claims, 16 Drawing Figures

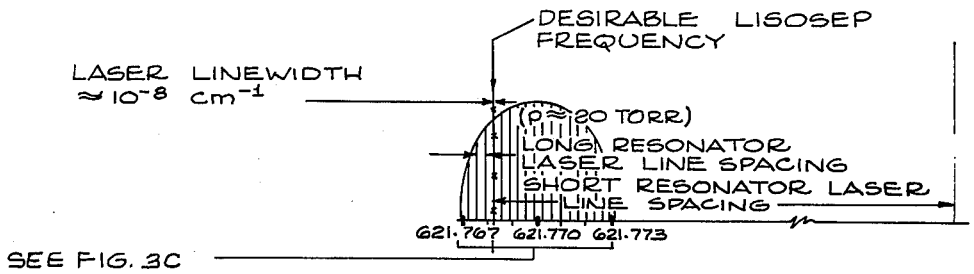
FIG. 3F
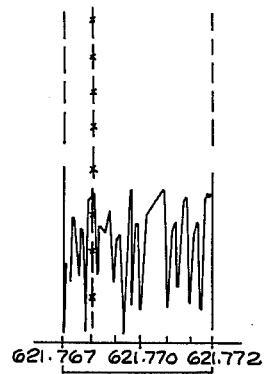
FIG. 3E
FIG. 3D

HIGH MASS ISOTOPE SEPARATION PROCESS AND ARRANGEMENT

REFERENCE TO RELATED APPLICATIONS

This patent application is a continuation in part of my patent application Ser. No. 262,661, filed June 14, 1972, and the technology and showing therein are incorporated herein by reference.

BACKGROUND OF THE INVENTION

1. Field of the Invention

This invention relates to the isotope separation art and, more particularly, to a selectively photon-induced energy level transition of an isotopic molecule containing the isotope to be separated and a chemical reaction with a chemically reactive agent to provide a chemical compound containing atoms of the isotope desired.

2. Description of the Prior Art

In many applications, it is often desired to provide an isotopically concentrated element. That is, many elements exist in nature in several different isotopes and it is desired to isolate a single isotope to provide a substantially higher concentrate of the isotope than occurs naturally. One such application, of course, is providing a high concentration of the isotope $U^{235}$. $U^{235}$ constitutes only 0.7% of naturally occurring uranium. The balance of the uranium, 99.3% is $U^{238}$.

Many different techniques have been proposed and/or utilized to provide the separation of the isotope $U^{235}$ from naturally occurring uranium. Among these techniques have been gaseous diffusion through porous barrier materials, electromagnetic separation, centrifuging, thermal diffusion, chemical exchange and, more recently, ultra-centrifuge and jet nozzle techniques. Of these, the most widely used technique is the gaseous diffusion technique which, unfortunately, is relatively inefficient, comparatively expensive and requiring multiple passes of gaseous uranium through the barrier materials to obtain a high concentration of the $U^{235}$.

Other isotopic separation techniques have been utilized for elements which have a low boiling point. For example, there has heretofore been proposed, in U.S. Pat. No. 2,713,025, an isotope separation technique applicable to mercury wherein a mercury vapor lamp, containing isotopically pure mercury, is utilized to irradiate a low-temperature vapor of naturally occurring mercury. The photons from the isotopically pure mercury vapor lamp excite only the same isotope atoms in the mercury vapor and cause photon-induced transitions between energy states thereof. At an excited energy state the mercury combines with water to form mercuric oxide. Since the photons were emitted from a single isotope of the mercury, only the same corresponding isotope in the mercury vapor was excited and thus isotopically pure mercury could be obtained from subsequent processing of the mercuric oxide. This technique, while applicable to some low boiling-point elements, cannot be readily adapted to the higher boiling-point isotopes such as uranium without severe penalties in process economics. The reason is that to provide a vapor of uranium would require comparatively high temperatures. To prevent excessive pressure broadening and Doppler broadening of the absorption/emission lines of the uranium atoms such that the absorption/emission lines of the $U^{238}$ atoms substantially overlap the $U^{235}$ atoms, expensive operations at pressures on the order of $10^{-2}$ Torrs and temperatures of 2000° to 3000° K are necessary. U.S. Pat. No. 3,673,406 merely shows an improvement to U.S. Pat. No. 2,713,025 but does not in any way indicate how the above shortcomings can be overcome.

Another technique heretofore proposed involving photoninduced transitions, as disclosed in U.S. Pat. No. 3,405,045, involves the irradiation of organic monomers with coherent radiation from a laser to effect a photo-disassociation of the monomer into free radicals. The free radicals then are utilized to initiate a polymer chain reaction, thus effecting the desired polymerization. Such teaching does not appear to be generally applicable to isotope separation.

Another technique, specifically designed for isotope separation of uranium hexafluoride ($UF_6$) to obtain, ultimately, isotopically concentrated $U^{235}F_6$, as disclosed in U.S. Pat. No. 3,443,087, involves irradiating a moving stream of $UF_6$ with two separate beams of electromagnetic radiation. The first beam of electromagnetic radiation raises the internal energy of only the $U^{235}F_6$ from the ground energy state to a higher, excited energy state. The second beam of electromagnetic radiation acts only upon the excited-state $U^{235}F_6$ molecules and raises them past the ionization potential to provide ionized molecules of $U^{235}F_6$. A magnetic field and/or an electric field are then applied to the ionized $U^{235}F_6$ molecules to deflect them from the path of the unexcited $U^{238}F_6$ molecules in an attempt to effect the separation. However, while the utilization of lasers to provide the photons has been suggested, no technique for selectively providing the photons in the first beam of electromagnetic radiation only with energies corresponding to the $U^{235}F_6$ transitions, and not also to the $U^{238}F_6$ transitions was actually proposed. Further, the partial utilization of electronic-excited and/or ionized states limits reaction times, since the decay time for electronic-excited and ionized states is quite short. Finally, and most importantly, there is considerable overlap of spectral lines of $U^{235}F_6$ and $U^{238}F_6$ under practical operating conditions that allow significant ionization and/or electronic excitation in gaseous $UF_6$ thereby rendering this isotope separation process rather inefficient.

In another isotope separation technique utilizing a hydrogen fluoride laser, as disclosed in "Isotope Separation with the CW Hydrogen Fluoride Laser," *Applied Physics Letters*, Vol. 17, No. 12, Dec. 15, 1970, separation of low mass molecules to effect a separation of deuterium from hydrogen is proposed. This technique involves the irradiation of a gas combination of methanol $H_3COH$, deutero-methanol $D_3COD$, and bromine $Br_2$. The methanol is intended to be selectively reacted with the bromine, leaving the deuteromethanol in the gas phase. Deuterium is, of course, the desired isotope to be concentrated. Thus, the methanol absorbs the radiation from the hydrogen fluoride laser and reacts with the bromine. No filtering or fine tuning of the laser radiation is utilized since the absorption lines of the methanol $H_3COH$ and the deutero-methanol $D_3COD$ are very widely separated. High mass isotopes, on the other hand, have very closely spaced absorption lines that are virtually optically unresolvable except at very low temperatures and/or pressures. Consequently, direct unfiltered and/or untuned utilization of laser radiation to effect isotopic separation in high mass molecules is not practical.

U.S. Pat. No. 3,772,519 merely shows a separation technique for atoms utilizing lasers for preferential isotope excitations and subsequent ionization together with an electromagnetic separation.

German Patent No. 1,959,767 and British Patent No. 1,284,620 by Karl Gurs cite some general concepts of isotope-selective excitation of molecules in the vibrational and/or rotational modes, with a $CO_2$ laser, and chemical reaction with an excited molecule. However, no new method or satisfactory technique is revealed in these patents beyond what was already known (see for example J. de Chim. Physique 60, 205 (1963)). No satisfactory structure is shown or described for providing an operable device by which the isotopes of uranium, for example, can be separated by incorporating a laser excitation of uranium hexafluoride. Further, the physical parameters and conditions set forth therein do not appear to be in the correct range for achieving the desired result. (See for example the report on Gurs' most recent attempts to effect the isotope separation of uranium hexafluoride as disclosed in a recent paper: "Uranium Isotope Separation Using IR Lasers" by H. Jetter and K. Gurs, Paper No. 4, International Conference on Uranium Isotope Separation, London, Mar. 5-7, 1975. The inventor reported that, utilizing Gurs' suggested techniques, no satisfactory separation could be achieved.

Thus, there has not heretofore been provided a completely satisfactory and economical photochemical technique for separating heavy isotopes and, in particular, for isotopic separation of desired $U^{235}$ isotope from naturally occurring uranium.

SUMMARY OF THE INVENTION

Accordingly, it is an object of the present invention to provide an improved isotope separation technique.

It is another object of the present invention to provide an improved isotope separation technique that is particularly useful in the separation of high mass isotopes.

It is yet another object of the present invention to provide an improved isotope separation technique for separating $U^{235}$ isotope from naturally occurring uranium, which technique is comparatively economic in operation and provides a high yield of concentrated $U^{235}$ isotope.

In the following summary of the invention, and the detailed description presented of the preferred embodiments of the present invention, there has been utilized the application of the present invention to the separation of $U^{235}$ from a mixture of molecules, some containing $U^{235}$ atoms and some containing $U^{238}$ atoms. It will be appreciated that the separation technique of the present invention may equally well be utilized with other elements to provide isotopic separation. However, because of the importance of $U^{235}$ as a major supplier of energy and the necessity of obtaining a higher concentration of $U^{235}$ than in normally occurring uranium the principles of the present invention are best exemplified by utilizing, as an example, the separation of the isotope $U^{235}$.

In the preferred embodiment of the present invention, there is provided both a process and the apparatus for selectively separating a predetermined isotopic molecule from a collection of chemically identical but isotopically different molecules. For example, a mixture of gaseous $UF_6$ containing $U^{235}F_6$ and $U^{238}F_6$ molecules is contained within a reaction chamber. A chemically reactive agent which, for utilization in separating $U^{235}$ according to the principles of the present invention, may be gaseous hydrogen chloride, is also introduced into the reaction chamber. The mixture of the chemically reactive agent may be either continuously supplied and removed from the reaction chamber or it may be charged and discharged as in a batch process.

The mixture of molecules in the reaction chamber is maintained at preselected values of temperature, pressure, electric field, magnetic field, and whatever other conditioning parameters can be used to effect the original total energy state of the molecules. The initial state of a molecule may be termed the lower energy state. The molecules are capable of storing additional energy internally in discrete amounts by the three mechanisms of electronic excitation, vibrational excitation, and rotational excitation, in any combination. Any of these energy states requiring additional energy is referred to as a higher energy state, and if a particular one is considered it is called the upper energy state. For example, when utilizing $UF_6$, the preselected conditions may be chosen so that the lower internal energy state of the $UF_6$ molecules comprises the ground (lowest possible) electronic energy level, a certain distribution of low-level vibrational energy states, and a certain distribution of rotational energy levels determined by the temperature while the upper energy state might comprise the ground electronic level, a particular combination of higher level vibrational energy states, and the same distribution of rotational levels as in the lower state.

The chemically reactive agent is defined herein in its broadest sense and though, in preferred applications, it is chemically changed after the desired chemical reaction has taken place in some applications it may serve only to assist, catalyze, or promote the desired chemical reaction and does not change chemically itself.

The chemically reactive agent is virtually inactive with the molecules at the lower energy state, but is chemically reactive with the molecules or promotes desired reaction when they are at certain higher energy states containing predetermined vibrations. When the chemically reactive agent interacts with the molecules at said higher energy state, a chemical compound is produced and the chemical compound is in a second physiocochemical state different from the first physicochemical state at which the mixture is maintained. For example, if the chemically reactive agent is gaseous hydrogen chloride, the $UF_6$ may be mixed with it and maintained in a gaseous state at the lower energy state with very little chemical reaction taking place, while after the $UF_6$ molecules are excited to the upper energy state containing the predetermined $\nu_3$ vibration, substantial reaction with hydrogen chloride takes place, providing gaseous $UF_5Cl$ and HF as desired reaction products. The desired chemical compound $UF_5Cl$ is chemically different from $UF_6$ and may be separated out of a gaseous $UF_6$/hydrogen chloride mixture by simple differential freezing. In forming $UF_5Cl$, one molecule of chemically reactive agent HCl is consummated for each $UF_5Cl$ molecule that is formed.

In another example, gaseous $UF_6$ may be mixed in with gaseous helium or argon and after the $UF_6$ molecules are excited, they dissociate to precipitable $UF_5$ or $UF_4$ and gaseous $F_2$ as desired reaction products. In this case, the helium or argon atoms hinder dissociated fluorine atoms F, from reassociating themselves with $UF_5$ to reform the original $UF_6$, promoting instead the formation of molecular $F_2$ from the F atoms. The chemically active agent helium or argon atoms remain unchanged in this case. The desired chemical compound $UF_5$ formed is in the solid physical state and will precipitate out of the gaseous $UF_6$/helium or $UF_6$/argon mixture and can thus be separated physically.

In general, if the chemical compound produced is in the same physical state as the original mixture, separation may be effected by standard chemicals separation techniques such as solvent extraction, distillation, evaporation, freezing, and others, while if the physical state of the product is different from the physical state of the original mixture, simple physical separation of the product from the reactants may be effected. Thus, a change in the physiocochemical state may be a change in the physical state, a change in the chemical state, or both.

In order to effect the selective reaction of mostly the predetermined isotopic molecules containing the isotope that is to be separated, it is necessary to induce the transition of mostly the predetermined isotopic molecules from the lower energy state to a certain higher energy state. The selective isotopic excitation is achieved by subjecting the contents of the reaction chamber to a beam of photons having energy at a particular frequency at which relatively strong absorptions occur which cause the transition from a lower energy state to a particular higher energy state of the predetermined isotopic molecule which contains a predetermined vibration, and at which frequency relatively weak absorptions occur that cause internal energy transitions in the other isotopically different but chemically identical molecules contained within the reaction chamber. Therefore, mostly the predetermined isotopic molecules are selectively excited. At said excited state, the predetermined isotopic molecules can interact with the chemically reactive agent to provide the chemical compound. In applications where the reactive agent is itself chemically modified in the reaction, an excess of chemical reactive agent is provided so that a majority of the predetermined excited molecules may be made to experience desired reactions before losing their excitation energy by possible exchange collisions with other molecules including those containing the other isotope. Since in preferred embodiments of the invention, mostly the predetermined isotopic molecules are excited by photons and a majority of them are caused to react before a collision with energy exchange to the other isotopic molecule can occur, the chemical compound formed contains a preponderance of atoms of the predetermined isotope. In applications where the chemically reactive agent is itself not chemically changed but only catalyzes or promotes the desired reaction, an excess of active agent is provided to prevent dissociation products from recombining back to the original composition. If the desired chemical product compound is at a different physical state than the molecules of the mixture, the chemical product compound may be physically removed from the reaction chamber as, for example, in the case that a solid precipitate is formed in a gaseous mixture. The precipitate may then be further processed, by conventional means, to provide the concentrated predetermined isotope. If the new chemical product compound is in the same physical state as the original mixture (e.g., both are gaseous), final separation may be accomplished by solvent extraction, distillation, condensation/evaporation, or other standard chemicals separation methods.

The beam of photons may be provided by a tuned laser which may be internally or externally filtered to suppress the production of or to remove photons with undesirable frequencies. Thus, a laser is selected whose output contains photons in the general frequency range associated with a particular photon-active transition of the molecules of the mixture from the original lower energy state to a particular upper energy state. Because of the phenomenon known as the isotope shift, the precise frequencies associated with strong photon-inducible transitions between the lower energy state and the upper energy state are somewhat different for the different isotopes and for the molecules containing the different isotopes.

Filtering of the laser output is achieved by passing the laser photons internally or externally through a filter cell, where by internal is meant placement of the filter cell internal to the laser between the end mirrors of the resonator system, and by external is meant that the filter cell is placed outside the laser in the path of the laser output beam. The filter cell contains a collection of the isotopic molecules contained in the reaction chamber other than the predetermined isotopic molecules and is, of course, provided with windows which allow the passage of the laser photon beam through the cell. It may also contain mirror arrangements to provide a long optical path. For example, with the reaction chamber containing $U^{235}F_6$ molecules and $U^{238}F_6$ molecules, the filter cell contains substantially pure $U^{238}F_6$ molecules if it is desired to react $U^{235}F_6$. Using an infrared laser with the filter cell placed internally, those photons having energy corresponding to strong transitions in the $U^{238}F_6$ molecules from the lower to a predetermined upper vibrational energy level are absorbed and thus prevented to lase, while those photons having frequencies that are slightly different and which correspond to a strong transition in the $U^{235}F_6$ molecules, in this example, from a lower rovibrational energy level to an upper rovibrational energy level, can pass through the filter cell and provide the beam of photons necessary to effect the selective excitation of the $U^{235}F_6$ molecules, in this example, in the reaction chamber.

In the above example it was assumed desirable to react $U^{235}F_6$. It may be preferable in some applications, to promote the reaction of $U^{238}F_6$ in the reaction chamber instead of $U^{235}F_6$. In such applications, the notations for $U^{235}$ and $U^{238}$ should be interchanged in applying the techniques herein.

The temperature, pressure, and other conditions of the $UF_6$ gas in both the filter cell and in the reaction chamber in this example must be chosen so that a high ratio of the microscopic absorption cross-sections of $U^{238}F_6$, $\delta_{238}$, and $U^{235}F_6$, $\delta_{235}$, exists at the applied laser frequency. For $UF_6$ a high ratio of microscopic absorption cross-sections of the isotopic molecules usually occurs at the edges of the central peak of the rovibrational absorption band where the absorption intensity of the continuum of Q-branches of the hot bands starts to drop towards the many structured P-branches or R-branches of the hot bands, for one of the isotopic molecules. The location of highest isotopic cross-section ratio on these Q-slopes or Q-edges is very sensitive to temperature. In fact small temperature adjustments, that is "temperature tuning," may be used to cause the optimum cross-section ratio to shift so that the absorption ratio is maximized nearer to a particular applied laser frequency. In general, the lower the temperature of the molecule, the steeper the Q-edge slopes, and the higher the isotope absorption cross-section ratio.

The failure of the prior investigators such as Gurs, mentioned above, to discover this phenomenon, or recognize the problems associated therewith, as well as failing to discover the other details of the UF$_6$ absorption band structures, as set forth herein, are reasons why the prior art teachings are totally insufficient.

For UF$_6$, the pressure is usually selected based upon considerations of the chosen temperature which sets a limit to the maximum allowed pressure, namely the vapor pressure of UF$_6$. This pressure is usually on the order of 1 Torr, at which adjacent rovibrational lines in the P-branches and R-branches regions do not quite overlap. When this is the case, a "hole" between adjacent rovibrational lines in, for example, the P-branches region of the U$^{238}$F$_6$ absorption band spectrum can exist, which coincides in frequency with the peak of one or more overlapping rovibrational lines of U$^{235}$F$_6$, thus providing a high ratio of U$^{235}$F$_6$ to U$^{238}$F$_6$ absorption cross-sections. Cross-section ratios at such peak/hole coincidences can in some bands of UF$_6$, such as the $\nu_3$-band, exceed the maximum cross-section ratio on the Q-slopes mentioned above. Typically for the $\nu_3$-band of UF$_6$, cross-section ratios of 10 or more can be attained for peak/hole tuned isotope separation, while for Q-slope operations, this ratio is on the order of 3 to 5.

For UF$_6$, the $\nu_3$, $(\nu_1 + \nu_3)$, $(\nu_2 + \nu_3)$ and $(\nu_3 + \nu_5)$ bands at temperatures below about 350° K and pressures below about 3 Torr, can be operated by the peak/hole technique in the P- and R-branches regions. Triple combination bands of UF$_6$, such as $3\nu_3$ and $(\nu_3 + \nu_4 + \nu_6)$ have their Q-branches so much spread out however due to intervibrational anharmonic interactions that they dominate even in the P- and R-branches regions, causing the entire band to become essentially solid. Thus, in practice, for operations on UF$_6$ triple combination bands, the Q-slope technique can be used effectively for isotope separation.

For less heavy molecules such as SeF$_6$ or MoF$_6$ there are less hot bands and the absorption band envelope is less totally continuous than that of UF$_6$. Instead, the P-branches and R-branches of SeF$_6$ or MoF$_6$ are more structured with wider openings between adjacent rovibrational lines (at sufficiently low pressures) and less overlap from the solid Q-branches. In this case, that is in the case of medium-heavy molecules, the best and highest cross-section ratio for efficient isotope separation is usually found within the P-branches or R-branches region at a peak/hole coincidence even for combination bands. The temperature and pressure should be chosen so that the rovibrational lines in the P- and R-branches of the rovibrational band are substantially separated, and such that in some regions of the spectrum in these branches the rovibrational lines of the preselected isotopic molecule do not significantly overlap with the rovibrational lines of the other isotopic molecules and fall substantially between the rovibrational lines of the other isotopic molecules. Thus high absorption cross-section ratios and efficient isotopic separation can be expected if excitation occurs at the frequencies of these least-overlapping rovibrational lines.

Usually the collection of molecules in the filter cell are maintained at or near the same lower energy state as those present in the reaction chamber.

Besides frequency tuning by the filter cell which causes avoidance of strong absorption by the undesirable isotope in the reaction chamber, the laser frequency may instead or in addition be further fine-tuned and locked by resonator mirror tuning adjustments so that the precise laser frequency coincides and stays at that frequency of the UF$_6$ absorption band where the ratio of the microscopic absorption cross-sections of U$^{235}$F$_6$ and U$^{238}$F$_6$ is optimum for isotope separation work. Various means of resonator mirror-tuning may be applied to improve isotope separation. For example, an adjustable grating end mirror may be used which pins the laser frequency to stay within the envelope of a particular lasable line of the laser medium which is close to the frequency region of the UF$_6$ absorption spectrum where the cross-section ratio is optimum. Further fine-tuning may then be accomplished by varying the laser mirror spacing, which causes fine changes in the exact frequency of the laser output.

In one embodiment of the invention further mirror-fine-tuning may be accomplished by a double resonator system in which the laser tube and filter tube are placed within the optical resonator space of the two laser mirrors that are spaced far apart, forming the long-leg resonator A, while one of these two laser mirrors which is partially transmitting is coupled to a second mirror spaced a short distance away forming the short-leg resonator B. The short-leg resonator B and the long-leg resonator A form a coupled double resonator system, whose allowed optical frequencies are determined by the spacing of the mirrors of the short-leg B of the double resonator system. By oscillating the outer mirror of the long-leg resonator A for example at 120 cycles per second, and by holding and setting the spacing of the mirrors of the short-leg resonator B to a fixed value, the double resonator system will allow lasing to break out 120 times each second at one very precise frequency determined by the value of the mirror-spacing of the short-leg resonator B. By changing the value of the mirror-spacing of the short-leg resonator B by a standard piezoelectric micro-positioning arrangement for example, different very precise laser frequencies may be tuned in.

In the preferred embodiment of the invention the filter cell is placed between the laser resonator end mirrors and a higher overall efficiency of operation is usually achieved since the filter cell suppresses the generation of laser photons having undesirable frequencies and mostly promote the generation of laser photons of the most desired frequency in the laser cavity. In another embodiment of the present invention, in which the filter cell is placed external to the laser end mirrors and the entire laser output is filtered therethrough, that portion of the laser output energy which is carried by laser photons with undesirable frequencies is removed and lost. In spite of the lower overall efficiency of the external filter cell arrangement in comparison with the internal filter cell placement, the former may be preferred sometimes since it provides more independence between laser operation and filter cell operation.

In still another embodiment no filter cell may be used at all and the reaction chamber may be placed internal to the laser cavity functioning simultaneously as a filter tube as well as reaction chamber. Finally in yet another embodiment a double-resonator tuned and locked laser may be used without the use of any filter tube.

BRIEF DESCRIPTION OF THE DRAWINGS

The above and other embodiments of the present invention may be more fully understood from the following description and the accompanying drawings wherein similar reference characters refer to similar elements throughout and in which:

FIGS. 3A, 3B, 3C, 3D, 3E and 3F are graphical representations of some physical characteristics associated with one embodiment of the present invention;

DESCRIPTION OF THE PREFERRED EMBODIMENTS

Figure 1:
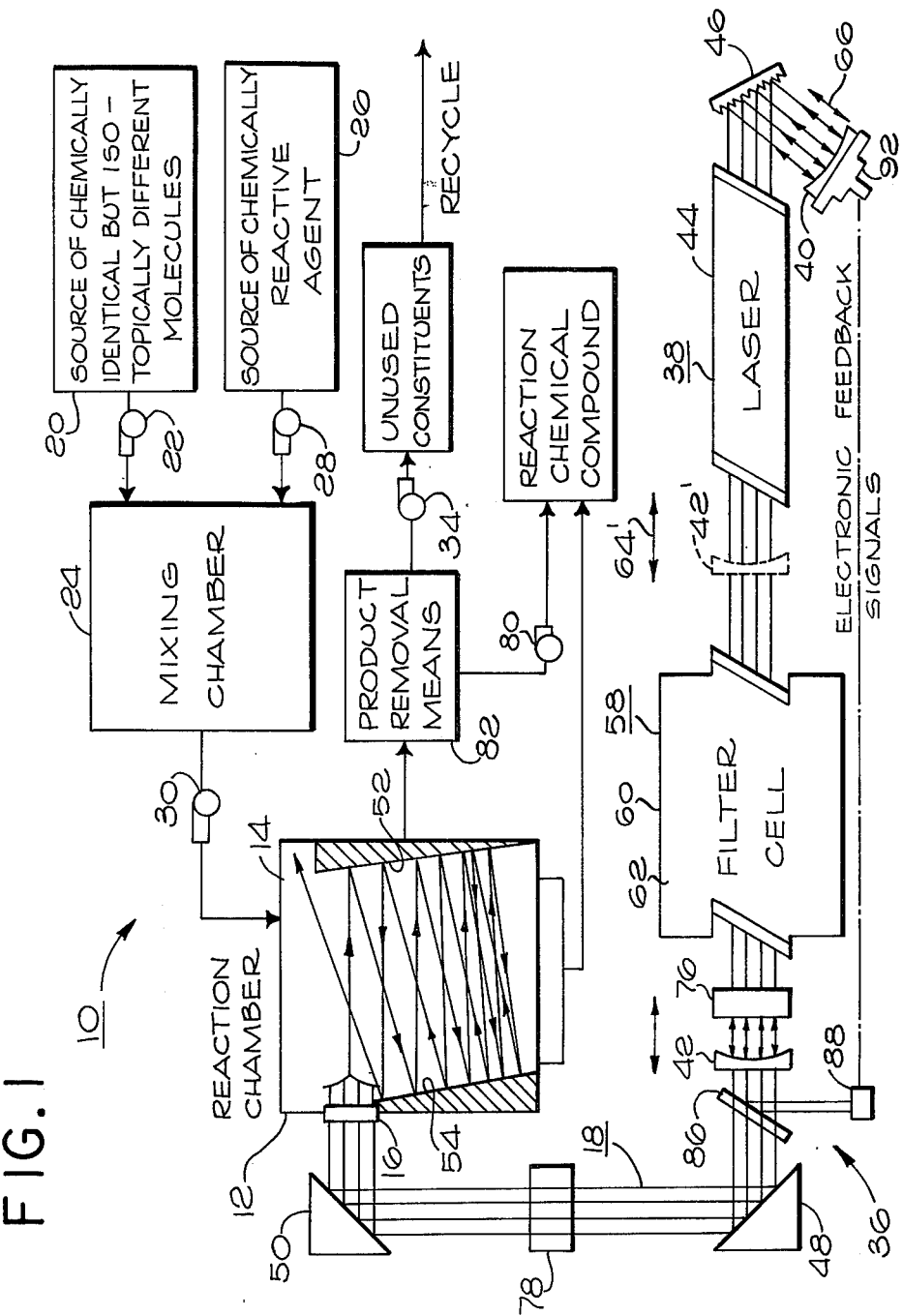
FIG. 1 is a schematic diagram of one embodiment of the present invention.

Before providing a detailed description of the preferred embodiments of the present invention, there is presented a brief discussion of the physical processes associated with the practice of the present invention in order to provide a more comprehensive understanding of the techniques associated with the practice of the present invention so that those skilled in the art may be more fully apprised thereof.

In a gaseous molecule there exist three main types of internal-energy-storing mechanisms, each one of which can acquire or discharge certain discrete quantities of energy. These are: the electronic, the vibrational, and the rotational internal-energy-storage mechanisms. Each of these types of energy-storing mechanisms possess certain discrete energy levels, and energy can be added or subtracted from storage, in quantities corresponding to differences between these energy levels, by either energy transfer during the collision with another molecule, or by the absorption or emission of a photon.

The quantities of energy exchanged (so-called quanta) in transitions between electronic levels are usually an order of magnitude larger than the quanta produced in transitions between vibrational levels, while quanta exchanged in rotational transitions have again energies that are an order of magnitude smaller than those of the vibrational transitions. In transitions involving the absorption or emission of photons, the wavelength of the photon associated with an electronic transition lies generally in the ultraviolet and visible part of the spectrum, the photon wavelength for vibrational transitions lies in the infrared, while rotational transitions give rise to photons with wavelengths that lie in the microwave region.

In general, the more atoms there are in a molecule, the more vibrating bonds can exist between atoms and groups of atoms, and the larger the number of so-called normal vibrations. Each normal vibration possesses a series of discrete energy levels, and in general a transition in the vibrational state of a molecule can involve simultaneous changes in the levels of any combination of normal vibrations.

With regard to the energy necessary to effect a transition from one electronic energy state to another electronic energy state by means of molecular collisions in which conversion of kinetic to potential energy occurs, since the energy exchange quanta required are comparatively high, in most molecules the higher electronic energy states are only achieved at temperatures approaching plasma temperatures on the order of 3000 degrees K or higher. Kinetic excitation of the higher vibrational energy levels, with the electronic state remaining at the ground level, can be achieved at typical temperatures of 200° to 2000° K. At low temperatures such as room temperature, approximately 300° K, there can generally be only kinetic excitations and de-excitations involving transitions between rotational and vibrational energy levels.

The kinetic excitations, in which during a collision between two molecules transitional kinetic energy is exchanged and electronic, vibrational, or rotational energy levels are changed, must be distinguished from molecular interactions with photons, where upon absorption or emission of a photon, the rotational energy levels, the vibrational energy levels and/or electronic energy levels are excited or de-excited. The absorption of a photon raises the internal energy of a molecule and the emission of a photon reduces the internal energy.

In photon-molecule interactions, not all possible transitions between lower and higher rotational, vibrational or electronic energy levels are allowed. Instead only certain transitions are allowed which are determined by so-called selection rules. Thus the number of excited rotational, vibrational or electronic transitions possible in photon-induced processes are limited to those defined by the selection rules. Further, the selection rules by defining the allowable transitions also define the photon energy necessary to achieve a certain transition from a lower to a higher energy level, either electronic, vibrational, or rotational, or in some combination. Transitions in which an electronic as well as a vibrational level are simultaneously changed, are termed vibronic transitions, while transitions in which the vibrational as well as the rotational level changes simultaneously, with the electronic level remaining the same, are termed rovibrational transitions. Since rotational energy level changes always occur during vibrational energy level changes, the rovibrational transitions are generally termed vibrational transitions. Thus, vibrational or rovibrational energy changes refer to the same state change. A vibronic transition is also accompanied by a simultaneous rotational transition, but the latter's effect on the vibronic transition is usually unimportant and therefore not specifically mentioned.

The radiative emission spectrum of a vibronic energy transition is generally a series of bands, where inside of each band there is a substructure composed of various rotational lines whose spacing and regularity are determined by the selection rules for radiative transitions. The radiative emission spectrum from a rovibrational transition is generally a single band. For heavy molecules, many low-energy vibrational levels are already kinetically excited, that is, the lower energy state of the transition contains various low-level vibrational states. In this case, a vibrational band is composed of a superposition of many so-called "hot-bands" whose contours are the same but whose intensities vary and whose frequencies differ due to the anharmonic shifts, those shifts being different for each different low-energy vibrational state to which the molecule was already thermally excited.

Typical liftimes for the spontaneous emission of radiation by molecules in electronic excited states and ionized states are on the order of $10^{-6}$ to $10^{-8}$ seconds. Hence chemical reactions with molecules in excited electronic states are difficult to achieve unless reaction times are faster than $10^{-6}$ to $10^{-8}$ seconds. One example of such fast reactions are dissociative reactions in which the molecule breaks apart because of the vibronic excitation.

Radiative lifetimes of vibrationally excited states are in the vicinity of 1 to $10^{-3}$ seconds. Hence sufficient time exists for chemical reaction via interaction with coreactants which at typical pressures of $10^{-4}$ to $10^{-2}$ atmospheres, usually requires $10^{-7}$ to $10^{-3}$ seconds per molecular reaction. Rotational states have radiative lifetimes usually in the range between 10 and $10^4$ seconds.

Aside from de-excitation of the vibrationally excited state by photon emission, another important loss mechanism is kinetic or collisional de-excitation, also called vibrational-translational (VT) relaxation. For efficient chemical reaction of laser-excited isotope molecules, the chemical reaction rate has to be on the order of, and preferably larger than, the VT relaxation and photoemission rates. In general, the heavier the molecule is, the slower the VT rate. The reaction:

$$UF_6^* (\nu_3) + HCl \rightarrow UF_5Cl + HF^* (\nu = 1 \text{ or } 2) \quad (1)$$

for example satisfies this condition, since chemical reaction of HCl with excited $UF_6$, ($UF_6^*$) which is excited to the $\nu_3$ vibrationally excited state, is more rapid than the VT de-excitation rate of the $\nu_3$ vibration by other $UF_6$ molecules. Also the so-called vibrational-vibrational or VV transfer of the $\nu_3$ vibration from say $U^{235}F_6^*$ to $U^{238}F_6$ is slow compared to the chemical reaction rate for the same reasons, namely the heavy mass of $UF_6$. Reaction (1) requires $UF_6$ to be excited to one or more levels of the $\nu_3$ vibration. Other vibrations such as $\nu_5$ or $\nu_6$ cannot produce an activated complex that leads to reaction (1).

It has been found experimentally that reaction (1) proceeds with a quantum efficiency of about 25% at a total pressure of 3 Torr and temperature of 295° K. The reaction is exothermic liberating approximately $1 \pm 0.5$ eV of energy and will be nearly thermoneutral if the HF created is once or twice excited vibrationally ($h \nu_e = 0.513$ eV). Thermoneutral reactions are known to proceed at high rates. Excitation of the $\nu_3$ vibration in $UF_6$ has been found essential for chemical reaction with HCl. At room temperature $UF_6$ is already substantially excited to many vibrational levels including the $\nu_3$ level, but most of these excited states are the lower-lying vibrations $\nu_6$, $\nu_5$ and $\nu_4$. When $UF_6$ is pumped to the $\nu_3$ level with a suitable laser such as the ClF laser, the $\nu_3$ population of $UF_6$ is forced to greatly exceed the thermal population level of $\nu_3$. Because of the slow VT and VV relaxation of the $\nu_3$ vibration (essentially due to the high mass of $UF_6$) a high $\nu_3$ population build-up is possible and chemical reaction with HCl in a $UF_6$/HCl mixture is greatly enhanced above the thermal reaction rate.

In considering the energy transitions useful in the practice of the present invention, consideration must be given not only to the allowable energy transitions of the molecules but also to the means for generating the photons having the energies corresponding to the desired energy transitions.

A vibrational absorption band, whether part of the series of bands in a vibronic spectrum or a band from a rovibrational spectrum, comprises an envelope extending over a known region of photon frequencies and within this envelope there are nearly discrete frequencies also called lines that correspond to the allowed rotational plus vibrational (rovibrational) energy transitions. The rovibrational lines are subject to pressure and temperature broadening. That is, as the temperature of the molecules is raised, the small variation in allowed frequencies associated with each rovibrational line increases. At sufficiently high temperatures there is a substantial overlap of the lines and there is no longer any spacing between the lines. This broadening effect on the rovibrational lines is often called "temperature broadening." Another effect that causes the lines to broaden occurs when the pressure or density of the molecules is increased. This is called "pressure-broadening."

Most vibrational bands can be divided into three distinct regions, namely the P-, Q-, and R-branch. The rovibrational lines in the P- and R-branches (comprising the left and right wings of the band) are, at suitably low pressures, rather widely spaced, but in the centrally located Q-branch, adjacent rovibrational lines always overlap so that the central Q-branch in a rovibrational band always appears as a wide solid strong emission or absorption band. If the normal frequencies are sufficiently high ($\nu_\alpha \gtrsim 1000$ cm$^{-1}$), one single vibrational emission or absorption band usually exists, but if they are low ($\nu_\alpha \lesssim 1000$ cm$^{-1}$), a number of so-called "hot-bands" are susperposed at room temperature, each one of which is composed of a single P-, Q-, R-branch sequence. Because each hot-band is slightly shifted in frequency compared to the cold-band due to anharmonic effects, the totality of superposed hot-bands causes the average spacing of rovibrational lines in the P- and R-branches to be considerably shortened, while the hot Q-branches cause the center portion of the band to become a considerably spread-out continuum absorption (or emission) region.

A hot-band transition is one in which the lower vibrational level of the basic transition under consideration is not the absolute ground state, but a state in which one or more normal vibrations of low frequency are excited. In general, the heavier the atoms are in a molecule, the lower the vibrational frequencies and thus the more copious hot-band formation is. Also the higher the temperature is, the larger the number of hot-bands that exist. For $UF_6$ at room temperature, some thousand effective hot-bands exist, while at 235° K this number is about three hundred. As a result, a large portion of the absorption spectrum in the center of a vibrational band of $UF_6$ is continuous due to the domination of the many distributed Q-branches. However, some regions with open structures occur far out in the P-branches region and in a limited portion of the R-branches region, if gas pressures are generally below about 3 Torr.

In general, the lower the temperature, the more compact the Q-branches region becomes and the more open structure there is in the P- and R-branches regions. Also, a fundamental band ($\nu_3$ or $\nu_4$ in $UF_6$) has less domination by Q-branches than a double or triple combination band such as $3\nu_3$. For the latter there is greater intervibration anharmonic shifting. For the $(\nu_3 + \nu_4 + \nu_6)$ and the $(3\nu_3)$ triple combination bands of $UF_6$, for example, the Q-branches are spread out over more than 12 cm$^{-1}$ of frequency space at room temperature, thus essentially causing the entire band to become one solid band with no open structure. In these cases, isotope separation can generally be accomplished with good efficiency at frequencies on the edges of the Q-branches envelope, either on the low-frequency or high-frequency side.

This spectral approach is termed the "Q-slope method," to distinguish it from "peak-hole" operations in the open-structured P- or R-branches regions, as discussed below.

For the $(\nu_3 + \nu_4 \nu_6)$ and $(3\nu_3)$ bands of $UF_6$, whose frequencies are close to the $CO_2$ and CO laser emission lines, the hot Q-branches dominate the entire band, even at low temperatures. Thus, in these cases "Q-slope operation" is indicated. The slopes of the Q-edges become steeper as the temperature decreases and thus, for two isotopic molecules whose spectra are isotope-shifted, possibilities for isotope separation become better (that is, higher) at lower temperatures since the ratio of the absorption cross-sections of the isotopic molecules becomes larger. On the high-frequency edge, the slope of the Q-branches envelope varies theoretically approximately inversely with temperature T if the logarithm of the absorption cross-section is plotted against frequency. Thus, the lower the temperature, the steeper the slope, and the better the chance for good isotope separation by the Q-slope method because of the higher absorption cross-section ratio.

For the fundamental $\nu_3$ band of $UF_6$, the solid Q-branches in the central region only occupy approximately 5 cm$^{-1}$ at temperature of 300° K, and 3 cm$^{-1}$ of frequency space at 230° K. Thus, in contrast to the $3\nu_3$ and $(\nu_3 + \nu_4 + \nu_6)$ bands, the hot Q-branches of $\nu_3$, do not completely dominate the entire absorption band. P- and R-branches regions with peaks and holes can exist for $\nu_3$, if the pressure is below about 1 Torr.

Significant single-stage isotope separation is possible as a result of the above considerations by tuning a suitable laser line from a ClF laser, for example, on a P-branches or R-branches peak of $U^{235}F_6$, which coincides with a hole in the $U^{238}F_6$ spectrum of vice versa as discussed below in connection with FIG. 3. This method is termed the "peak-hole" spectral approach, in contrast to the Q-slope approach discussed above.

In general, for the Q-slope approach, frequencies at which the isotope absorption cross section ratio ($\delta 235/\delta 238$ or $\delta 238/\delta 235$) is 2 to 5 can be found, while by the peak-hole method a ratio of about 10 or more is possible for $UF_6$.

If only certain rovibrational transitions of one isotope in the P- or R-branches of a vibrational band are to be induced, and not ones of adjacent overlapping lines of other isotopes, and provided that the spreading of hot Q-branches is limited and allow this, it is necessary that the temperature and pressure of the molecules be kept comparatively low so that the frequency widths of the rovibrational lines are small and at least smaller than the frequency difference between the centers of two consecutive rovibrational lines, also called the line spacing. A low temperature further minimizes hot-band formation and thus minimizes possible domination of the structured P- and R-branches by the continuous Q-branches.

Another physical feature that is important to the understanding of the principles of the present invention is the so-called isotope frequency shift of vibrational energy level transitions. Since the frequency of the photon associated with certain transitions between vibrational energy levels depends on the mass of the molecule, the center frequency of the vibrational bands of two chemically identical but isotopically different molecules will be somewhat different. An isotope shift also exists for electronic energy level transitions but this shift is much smaller than the isotopic shift associated with the vibrational energy level transitions.

Because the frequencies of the vibrational bands of two chemically identical but isotopically different molecules are thus shifted, the rovibrational lines of the P- and R-branches of the band of one of the isotopic molecules may fall substantially between the rovibrational lines in certain regions of the P- and R-branches of the band of the other isotopic molecule under conditions when, and in regions where, hot Q-branches do not dominate. Hence, to effect isotope separation in an isotopic mixture of molecules under such conditions, the mixture is irradiated with extremely monochromatic photons at a frequency that coincides with the peak of some one of twenty overlapping rovibrational lines in the rovibrational band of only one of the two isotopic molecules and with no or much fewer rovibrational lines of the other isotopic molecule. In general, with currently available lasers, infrared lasers can provide photons of the monochromaticity necessary to excite the sharp peaks of one to twenty coinciding rovibrational lines in a rovibrational band, while ultravioletlasers can excite such peaks in a vibronic band. Therefore, in the preferred embodiments of the present invention described herein, a laser is employed as the source of photons. However, it will be appreciated, any other source yielding such photons may be substituted if available.

If continuous hot Q-branches dominate in most of the absorption band of a molecule with two or more isotopic species, the optimum frequency for isotope separation is usually where the slope of the Q-branches microscopic absorption cross-section envelope (but not of the Q-branches transmission curve) is highest but for one of the isotopic molecules. This steepest Q-branches envelope region occurs in most cases at the left or right edges of the Q-branches envelope where the intensity of the totality of hot Q-branches drops off to reach the same level as the line intensities of the P- or R-branches. In such a Q-slope region the ratio of the absorption cross-section of the preselected isotopic molecule to that of the other isotopic molecule would be highest and thus isotope separation would be optimum. Again, photons having a high degree of monochromaticity are required to provide the maintainance of a high isotope absorption cross-section ratio.

Because the vibrational isotope shift of molecules is usually considerably larger than the electronic isotope shift associated with atoms, the employment of molecules and the vibrational isotope shift thereof in the present invention yields substantially more efficient isotope separation than if atoms, in elemental form, were utilized and isotope separation were attempted by the electronic isotope shift, as has been heretofore proposed. This is particularly true for high-boiling-point elements which can form a low-boiling-point molecule.

Also, the higher the mass of the isotopic elements, the more difficult it is to employ elemental atomic isotope separation with the pure electronic isotope shift. Thus, molecular isotope separation, which relies on the vibrational isotope shift, is more practical.

To insure that the laser photons used in this invention possess a frequency that most closely matches a frequency in the absorption band where the undesired isotope has a hole, (peak-hole or line/hole method), or a region where the absorption intensity of the isotopic molecule to be separated is strong relative to the absorption intensity of the other isotopic molecule, (Q-slope method), the laser photon frequency can be tuned by means of a filter cell placed internal or external to the laser resonator system. Such a filter cell is usually essential for the peak-hole approach, but may be omitted in the Q-slope method. The filter cell contains molecules with atoms of an isotope different from the molecules with the isotope atoms to be excited and separated. Hence, laser photons with frequencies that match the frequencies of strong rovibrational lines of the molecules in the filter cell will be suppressed or removed by absorption, allowing only photons with frequencies between the peaks of the line frequencies to be generated or passed on from the laser. Since in certain spectral regions the molecules with the isotope to be excited and separated have strong rovibrational lines or other absorption regions with peaks at positions between the lines of the molecules in the filter cell, the laser photons can have frequencies that match or nearly match such strong absorption frequencies of the isotopic molecule to be excited and separated.

Additionally, mirror-tuning of the laser photon frequencies to effect better coincidence with a frequency at which the highest ratio of absorption cross-sections is obtained between the isotopic molecule to be excited and separated and the other isotopic molecule or molecules may be achieved by employing a rotatable grating as one end mirror for coarse tuning and varying the spacing between two additional, partially transmitting and closely spaced laser mirrors for fine-tuning. The fine-tuning resonator system comprising three mirror or partial mirror elements is often called a "double resonator system" or "coupled resonator system."

For the peak-hole approach, coarse and fine mirror tuning is usually essential, but for the Q-slope method only coarse-tuning with a rotatable grating is usually adequate.

Under some conditions, the vibrational isotope shift may cause many of the repetitively spaced rovibrational line frequencies in the P- and R-branches of the rovibrational band of one isotopic molecule to coincide with rovibrational line frequencies of the other isotopic molecule. However, since the spacing of rovibrational lines is not entirely linear and, since there are also splittings of each line due to intramolecular perturbations and, further since there are many nonproportional anharmonic shifts of the hot-bands, in the case of very heavy molecules such as $UF_6$, it has been found that there are regions in the frequency range of interest, where some rovibrational line frequencies of one isotopic molecule fall substantially between rovibrational line frequencies of the other isotopic molecule in the P- and R-branches frequency regions. By choosing an infrared laser having an output frequency in such a region, the laser frequency may then be adjusted by filtering and/or mirror-tuning, as described above, to coincide substantially with a preponderance of lines of one isotopic molecule.

Even for the condition wherein the hot Q-branches dominate the band spectrum the vibrational isotope shift creates regions in the spectrum where a high ratio exists of the absorption cross-section of one isotopic molecule with respect to that of another isotopic molecule. Such regions usually occur on the side slopes of the Q-branches envelope. An infrared laser wherein the frequency of the output photons can be tuned to such regions, as described, may be used for efficient isotope separation.

If the filter cell is placed internal to the laser resonator, that is between the end mirrors, and that laser is further tuned by means of the grating mirror adjustment to fall on a least-overlap or high cross-section ratio region, depending upon whether the peak-hole or Q-slope, respectively, technique is employed, only those photons are allowed to lase which are least absorbed by the filter cell, that is photons with the most desirable frequency for exciting the desired isotopic molecule. If the filter cell is placed external to the laser, and the laser frequency is coarse-tuned by means of the grating, it must be further fine-tuned by mirror spacing adjustment until a maximum of filtered photons passes through the filter cell and strong absorption occurs for the desired isotopic molecule. For such a condition, the laser photon frequency, or frequencies, are primarily between the frequencies of strong rovibrational lines, or at low absorption regions of the molecules in the filter cell, and coinciding with strong absorption lines or regions of the desired isotopic molecule to be excited and separated.

With the above in mind, reference is made to FIG. 1 wherein there is shown a schematic diagram of one embodiment of the present invention, generally designated 10. In the embodiment 10, there is provided a reaction chamber generally designated 12 having walls defining a cavity 14. A window 16 is provided in the reaction chamber 12 to allow the entrance therein of a beam of photons 18 having energy in preselected frequencies as discussed below in greater detail.

A source of chemically identical but isotopically different molecules 20 is connected to a pump 22 that pumps the chemically identical but isotopically different molecules into a mixing chamber 24. A source 26 of chemically reactive agent is pumped by pump means 28 into the mixing chamber 24. As described below in greater detail, the ratio of the amount of chemically identical but isotopically different molecules to the amount of chemically reactive agent is selected to provide a proper reaction therebetween. The contents of the mixing chamber 24 are pumped by pump 30 into the cavity 14 of the reaction chamber 12. It will be appreciated, of course, that the mixing chamber 24 may be omitted and the chemically reactive agent and the mixture of chemically identical but isotopically different molecules may be pumped directly into the cavity 14 of the reaction chamber. Or if the chemically reactive agent is in solid form and not consumed in the reaction, it may be placed directly in the cavity 14 of the reaction chamber 12.

Removal means 32 for solid product and/or removal means 82 for gaseous product, is connected to the reaction chamber 12 for selectively removing a preselected chemical product from the cavity 14 after the desired chemical reaction has been induced. A pump 34 may be utilized to remove from the cavity 14 of the reaction chamber 12 the contents thereof, while a pump 80 may be used for removal of product via means 82.

A means for generating the beam of photons 18, generally designated 36, is provided and, in preferred embodiments of the invention, it generally comprises a laser 38 having a pair of mirrors 40 and 42 utilized to achieve laser action within a laser cell 44, and a grating 46 for coarse-tuning the laser frequency. The laser mirror 42, in accordance with laser operational techniques, also has a certain percentage of transmission such as 2 to 30% transmission to allow the laser photon beam 18 generated by laser action to exit from the laser 38.

If desired, a frequency doubler 76 may be placed between the laser end mirrors to double the natural laser frequency of the photons. If a far-infrared laser is used, the frequency doubler may be, for example, a Cadmium Germanium Arsenide ($CdGeAs_2$) chrystal to provide photons having energy in the frequencies necessary to accomplish the selective isotopic separation according to the principles of the present invention.

A pair of mirrors 48 and 50 may be utilized to direct the beam of photons 18 through the window 16 in the reaction chamber 12 and into the cavity 14 thereof. Internal the cavity 14 there may be provided a pair of slightly tilted mirrors 52 and 54 which may be positioned as required to provide the necessary total path length for efficient absorption of the photons in the beam of photons 18 in the cavity 14 of the reaction chamber 12. Instead of the tilted-mirror pair 52 and 54, any other arrangement, including a simple long tube, "White" mirrors, and/or various combinations of mirrors and/or reflectors, may be utilized to create the required path length for absorption.

A filter cell 58, which may be considered to be part of the means 36 for generating the beam of photons 18, has walls 60 defining a filter cavity 62. A filter mixture is contained within the filter cavity 62 and the filter mixture is selected to remove from the beam of photons generated in the laser 38 those photons whose frequencies differ from those necessary in the beam of photons 18 to achieve the selective isotopic separation in the reaction chamber 12. The photon path in the filter cell 58 may be lengthened by means of standard tilted-flat-mirror-pair arrangements or curved-White-mirrors arrangements if necessary. In addition the photon beam 18 may be passed through a tunable Fabry-Perot filter 78 to remove any residual photons with undesirable frequencies. As can be seen from FIG. 1, the filter cell 58 lies in the optical path between mirrors 40 and 42 of the laser 38. This arrangement is usually preferred, since it directly minimizes the generation of laser energy at unwanted frequencies.

Alternatively, the filter cell 58 may be placed external to the mirrors associated with the laser 38. For example, the filter cell 58 may be placed external to the optical path between mirrors 40 and 42a' as shown by the dotted line position of mirror 42a' on FIG. 1, so that the filter cell 38 is not in the laser resonator system comprising mirrors 40 and 42a' and the laser cell 44. This arrangement allows more independence in operational control between the laser 38 and the filter cell 58, but may be less efficient than the internal arrangement described above, since some laser energy residing at unwanted frequencies may be removed from the laser beam by absorption and is subsequently lost. By mirror-tuning the laser frequency and use of the Fabry-Perot tunable filter 78, this loss may be minimized however.

Mirror-tuning of the laser 38 may be accomplished by setting the reflection grating 46 at the angle resonant to the desired laser line frequency, and by having, for example, laser mirror 40 adjustable in directions indicated by the double-ended arrows 66. Mirrors 40 and 46 form the short-leg, while mirrors 46 and 42 (or 42a') form the long-leg of the coupled double resonator system illustrated in FIG. 1. Making changes in the length of the short-leg, that is in the relative separation of mirrors 40 and 46 by means of piezoelectric drives 92 on the mirror mounts, will constitute ultra-fine-tuning. Mirrors 42 or 42' may further be piezoelectrically oscillated by suitable means, back and forth at 50 Hz or more along directions as indicated by the double-ended arrows 64 or 64a' to insure repetitive coincidence of the selected ultra-fine-tuned laser resonator line in the two legs of the double resonator system. Finally, automatic feedback may be used to prevent drifts or mirror positions by monitoring the laser output with a beam splitter 86 and a meter 88, which controls the piezoelectrically driven mirror mount 92. Of course instead of the double resonator system, a single resonator system may be desirable and sufficient in some embodiments of the invention in which case mirror 40 is omitted, and a grating end-mirror 46 with near-total return reflection and properly oriented with respect to mirror 42 or 42a', is employed.

The above described structure shown schematically in FIG. 1 is utilized in a process for separating predetermined isotopic molecules from a mixture of chemically identical but isotopically different molecules in order to obtain a concentration of the predetermined isotope far greater than the concentration in the naturally occurring element. For example, the above structure may be utilized in a process to provide a concentration of $U^{235}$ much greater than the 0.7% $U^{235}$ that is present in naturally occurring uranium.

As an illustrative example, the source of chemically identical but isotopically different molecules may comprise gaseous $UF_6$ containing predetermined isotopic molecules $U^{235}F_6$ and other chemically identical but isotopically different molecules $U^{238}F_6$. The chemically reactive agent in the source of chemically reactive agent 26 may be gaseous hydrogen chloride. The $UF_6$ and the hydrogen chloride may be mixed in the mixing chamber 24 in a ratio of, for example, one part $UF_6$ and five parts hydrogen chloride in order to provide an excess of hydrogen chloride so that the induced chemical reaction, as described below, has a higher probability of occurring.

The mixture of the $UF_6$ and hydrogen chloride is pumped into the cavity 14 of the reaction chamber 12 by the pump 30 and in one embodiment is maintained therein at a temperature of approximately 295° K and a total pressure generally between 1 and 100 Torr which parameters define the lower energy state of uranium hexafluoride according to the principles of the present invention. In another embodiment which gives somewhat higher isotope separation factors, the temperature is between 200° K and 235° K instead of 295° K and the total pressure maintained at a value between 0.05 and 5 Torr.

Selective excitation of the $U^{235}F_6$ molecules is achieved by photon absorption from the beam of photons 18 causing transitions in the $U^{235}F_6$ from the lower vibrational energy state to an upper vibrational energy state which contains the predetermined desirable $v_3$ vibration that promotes reaction with HCl. The beam of photons 18 cause relatively few excitations of the $U^{238}F_6$ molecules.

In order to achieve this selective excitation, that is to provide photon induced transitions of mostly $U^{235}F_6$ molecules and substantially less transitions of $U^{238}F_6$ molecules, the filter cell 58 is provided with a filter gas in the filter cavity 62 comprising substantially pure gaseous $U^{238}F_6$. The temperature of the filter gas may be approximately 290° K and the pressure between 0.1 and 10 Torr for reasons described below in greater detail. In another embodiment which gives better enrichment factors, the contents of the filter cell is at a temperature between 200° and 235° K, instead of 290° K, and the contents of the filter cell are maintained at a pressure well below 2 Torr.

When photons generated in the laser cell 44 pass through the $U^{238}F_6$ filter gas, those photons having frequencies equal to the frequencies associated with strong photon-induced transitions between the lower vibrational energy state and upper vibrational energy state of $U^{238}F_6$ are absorbed and thus prevented to lase, in the case of an internal filter cell arrangement. To insure simultaneously the strongest possible absorption by $U^{235}F_6$ and the highest molecular absorption ratio of $U^{235}F_6$ to $U^{238}F_6$, additional mirror-tuning may be carried out as described Thus, there is provided in the filtered beam of photons 18, a substantially pure beam of photons having energy giving rise to transitions with high absorption cross-sections for $U^{235}F_6$ but relatively low absorption cross-sections for $U^{238}F_6$. As this beam of photons passes through the cavity 14 of the reaction chamber 12, mostly the $U^{235}F_6$ and less so the $U^{238}F_6$ molecules will absorb these photons, and mostly the $U^{235}F_6$ molecules are raised from the lower vibrational energy state to the higher energy state. The hydrogen chloride gas cannot absorb any of the photons at the predetermined frequencies in the rovibrational absorption bands of $UF_6$. At the higher energy state, which contains the reaction-promoting $\nu_3$ vibration, the $U^{235}F_6$ molecules are chemically reactive with the hydrogen chloride gas and the following reaction takes place:

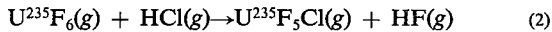

$$U^{235}F_6(g) + HCl(g) \rightarrow U^{235}F_5Cl(g) + HF(g) \qquad (2)$$

Since gaseous $U^{235}F_5Cl$ is in a state which is chemically different from gaseous $UF_6$ contained within the reaction chamber 14 and since $UF_5Cl$ has a much lower vapor pressure than $UF_6$, it may be removed by differential freezing in removal means 82 when the contents in reaction 12 are removed from it by pump 34, as discussed below in greater detail in connection with FIGS. 5, 6, 7, 8 and 9.

The remaining gaseous $UF_6$, the gaseous hydrogen fluoride (HF), and the gaseous hydrogen chloride (HCl), may be removed by the pump 34 for further separation, recycling, and reuse.

Both the $U^{235}F_5Cl$ product removal, as well as removal of the remaining gaseous mixture of $UF_6$, HF, and HCl, may be either carried out in a continuous fashion or batch-wise.

In some applications of the invention, all procedures remain as described except that in all statements $U^{238}$ is replaced by $U^{235}$ and $U^{235}$ by $U^{238}$. Such applications result in the chemical reaction of the excited $U^{238}F_6$ molecules, leaving the $U^{235}F_6$ molecules relatively unreacted. This type of operation is utilized where the absorption corss-section ratio $\delta 238 / \delta 235 > 1$.

Figure 2:
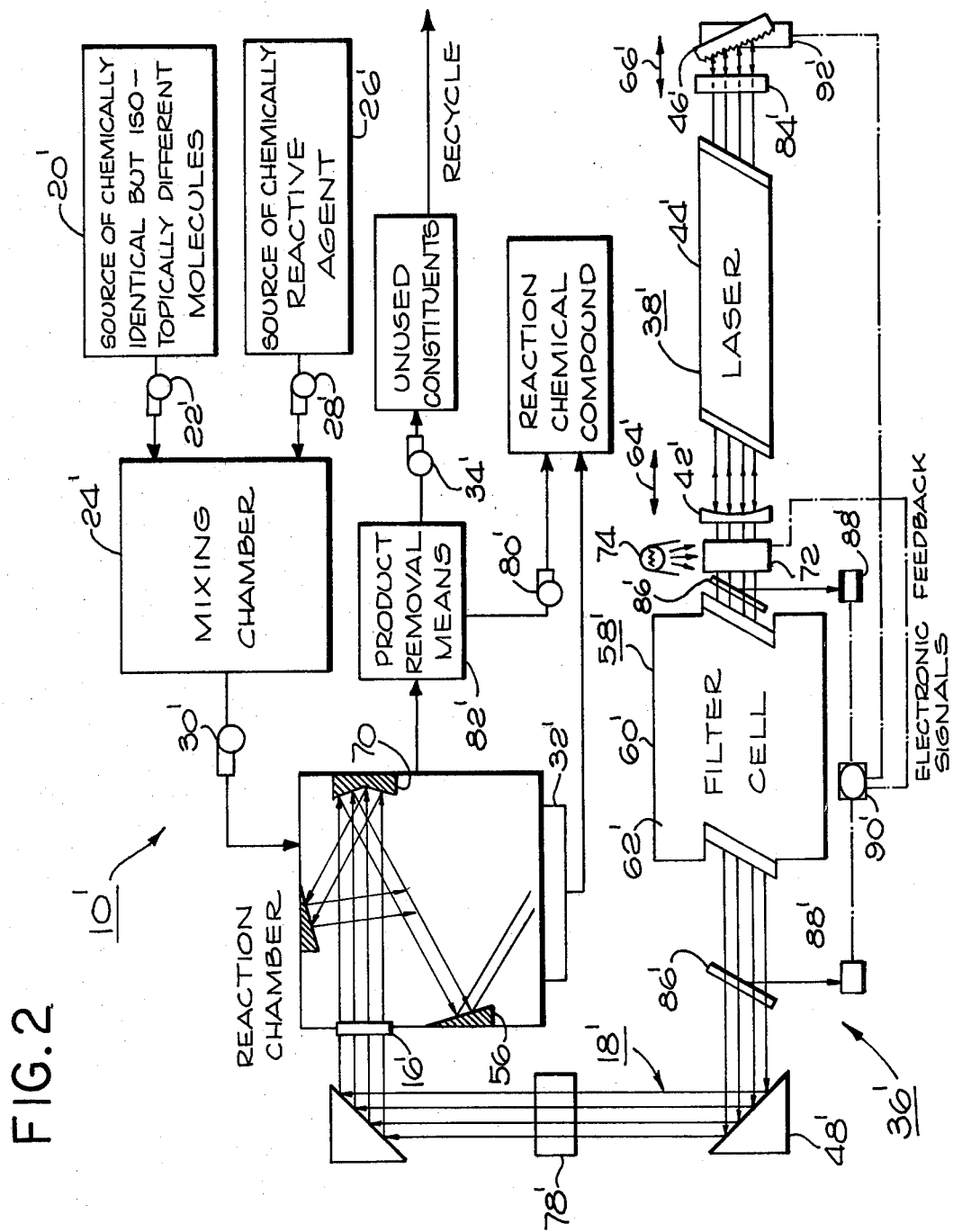
FIG. 2 is a schematic diagram of another embodiment of the present invention.

FIG. 2 illustrates another embodiment of the present invention generally designated 10'. Instead of employing a pair of tilted mirrors 52 and 54 as shown in FIG. 1, the arrangement in FIG. 2 shows another train of mirrors for the dispersement of laser photons in the reaction chamber 12', nemely mirrors 56, 68 and 70. Of course many other long absorptive optical paths, such as White's spherical mirrors, can be utilized, and the tilted mirror pair of FIG. 1 and the dispersive mirror configuration of FIG. 2 are only illustrative examples.

Also shown in FIG. 2 is a frequency conversion crystal 72 and source of idler radiation 74, placed outside of the laser 38', and placed in the laser beam path between the laser output mirror 42' and an externally placed filter cell 58'. The frequency conversion crystal 72 and idler pump radiation source 74 may be used in cases where it is desired to shift the frequency of a given laser to fall in the frequency range of a rovibrational or vibronic absorption band of the isotopic molecules to be separated.

Still another feature shown in FIG. 2 is a variation of possible double resonator arrangements. A partially transmitting mirror 84' couples the long resonator leg to the short-leg and a reflection grating 46' is used as end mirror in FIG. 2, instead of the all-reflecting short-leg optics arrangement used in FIG. 1. Either arrangement may be used in any embodiment of the invention. The external filter cell 58' serves the same function as the cell 58 of FIG. 1 and optimum output of desired filter photons may be obtained by tuning of the laser 38' by rotation of the grating 46' so that the angle of incidence is changed and by adjustments in the spacing between the laser cavity end mirror 46' and partial mirror 84', with or without use of an automatic feedback control loop comprising beam splitters 86', meters 88' and 98' and piezoelectric drive 92'. The remaining structure shown schematically in FIG. 2 may be similar to the corresponding structure shown in FIG. 1.

Figure 3C:
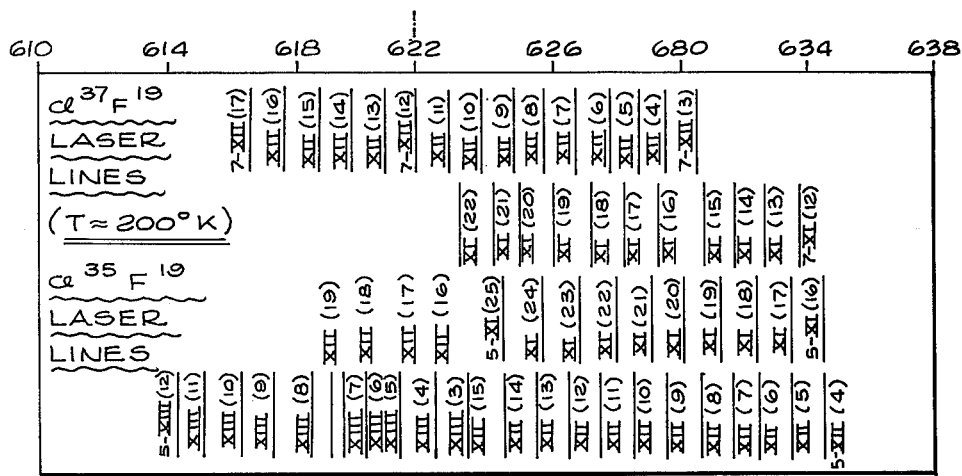
Figure 3B:
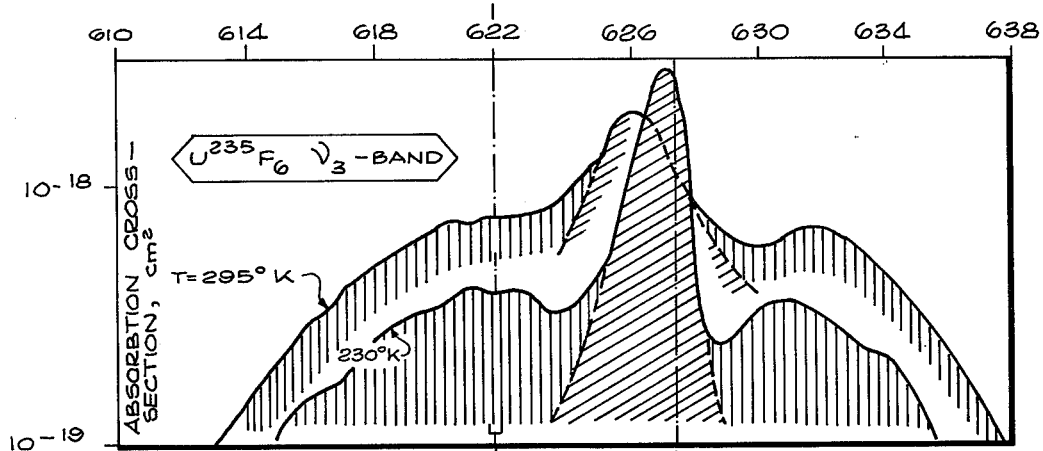
Figure 3A:
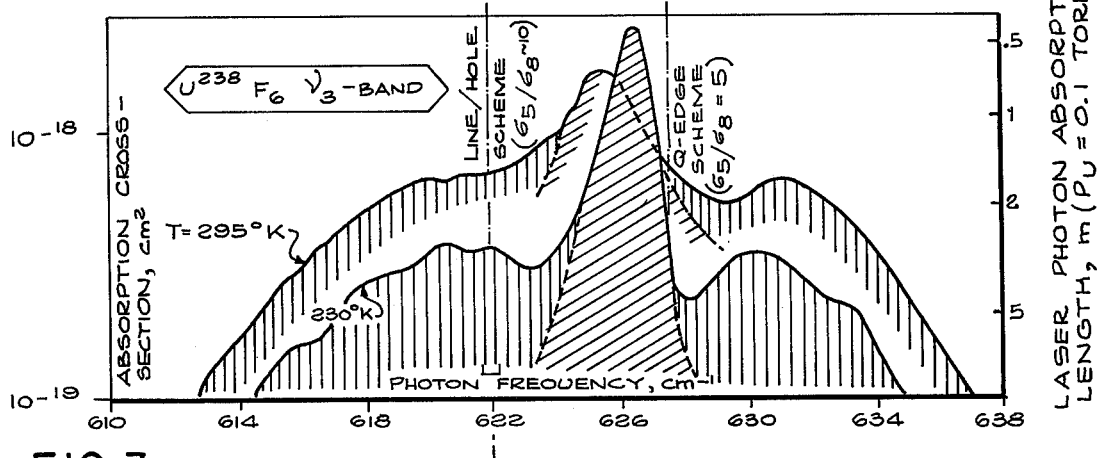

Because of the mass difference between two isotopically different but chemically identical molecules there is an isotope shift of the rovibrational and vibronic absorption spectra between the two. FIGS. 3A and 3B illustrate this phenomenon for the fundamental $\nu_3$ rovibrational absorption bands of $U^{238}F_6$ and $U^{235}F_6$ respectively, whose central frequencies are approximately at 626.4 and 627.1 cm$^{-1}$ respectively and therefore in the frequency range of the ClF laser emission lines shown in FIG. 3 C. The slanted line cross hatched regions in the $U^{235}F_6$ and $U^{238}F_6$ band spectra of FIG. 3A and 3B consist of many overlapping solid Q-branches from many hot-bands, while the regions with vertical lined shading consist of partially overlapping separated rovibrational lines of the many superimposed hot P-branches and R-branches on top of the continuous tail regions of the hot Q-branches. The "jungle" of rovibrational lines causes the fine-spectrum in this region to look as shown in the curves of FIG. 3D and FIG. 3E. The fundamental spacing of rovibrational lines is approximately 0.13 cm$^{-1}$. However, because of the superimposition of the many hot-bands which are shifted with respect to each other due to anharmonicity, and due to a six-fold Coriolis-splitting of the rovibrational lines, the average line spacing is on the order of 0.0005 cm$^{-1}$ as shown in the curve of FIG. 3D curve D which is an enlargement of a small portion of the left wing of the curves of FIG. 3A, and in the curve of FIG. 3E which is an enlargement of the same region of the curves of FIG. 3B. The rovibrational line widths vary with pressure and temperature, being about 0.0004 cm$^1$ at a pressure of 2 Torr, and a temperature of 290° K. At other pressures and temperatures the line width due to pressure broadening is given approximately by the equation:

$$\text{Line Width} = 0.00015p\,(T/290)^{-1/2} + 0.0002\,(T/290)^{1/2}\,\text{cm}^{-1} \quad (3)$$

where $p$ is the gas pressure in torrs and T is the temperature in degrees Kelvin.

The so-called "hot" bands are due to transitions whose lower energy state is not the zero or ground-state vibrational level but a low-lying excited vibrational level which is thermally excited. Each hot-band has the same series of lines as the "cold" or ground-state-connected band except that all frequencies are slightly shifted with respect to the cold band. As a result, instead of finding one rovibrational line every 0.13 cm$^{-1}$ in the P— and R— branch, which is the condition if there were only one cold band, there are actually many rovibrational lines in between these spacings due to the many superimposed hot bands that UF$_6$ has. In addition, the interaction of the molecular vibrations on the molecular rotations causes a so-called Coriolis-splitting of each absorption line into six, of which one or two are usually several times more intense than the others.

In one isotope separation method, as mentioned above, laser frequencies are used that coincide with the side slopes of the solid Q-branches region of a UF$_6$ absorption band. Good isotope separation is particularly favored where this slope is steepest, since at those frequency locations the largest difference between the absorption cross-section of U$^{235}$F$_6$ and U$^{238}$F$_6$ exists due to the isotope shift. Particularly bands with a high isotope shift such as $3\nu_3$ ($\Delta\nu$ i.s. $\approx 1.8$ cm$^{-1}$), would also be favorable although the gain from such an enhanced isotope shift caused by combination vibrations is somewhat tempered by the fact that the slopes of the Q-branches envelopes become gentler (less steep), the higher the degree of the combination is. For a given band, the slopes of the Q-branches envelope become steeper the lower the temperaure is and thus operation a the lowest possible temperaure compatible with other constraints is generally preferred.

Figure 4:
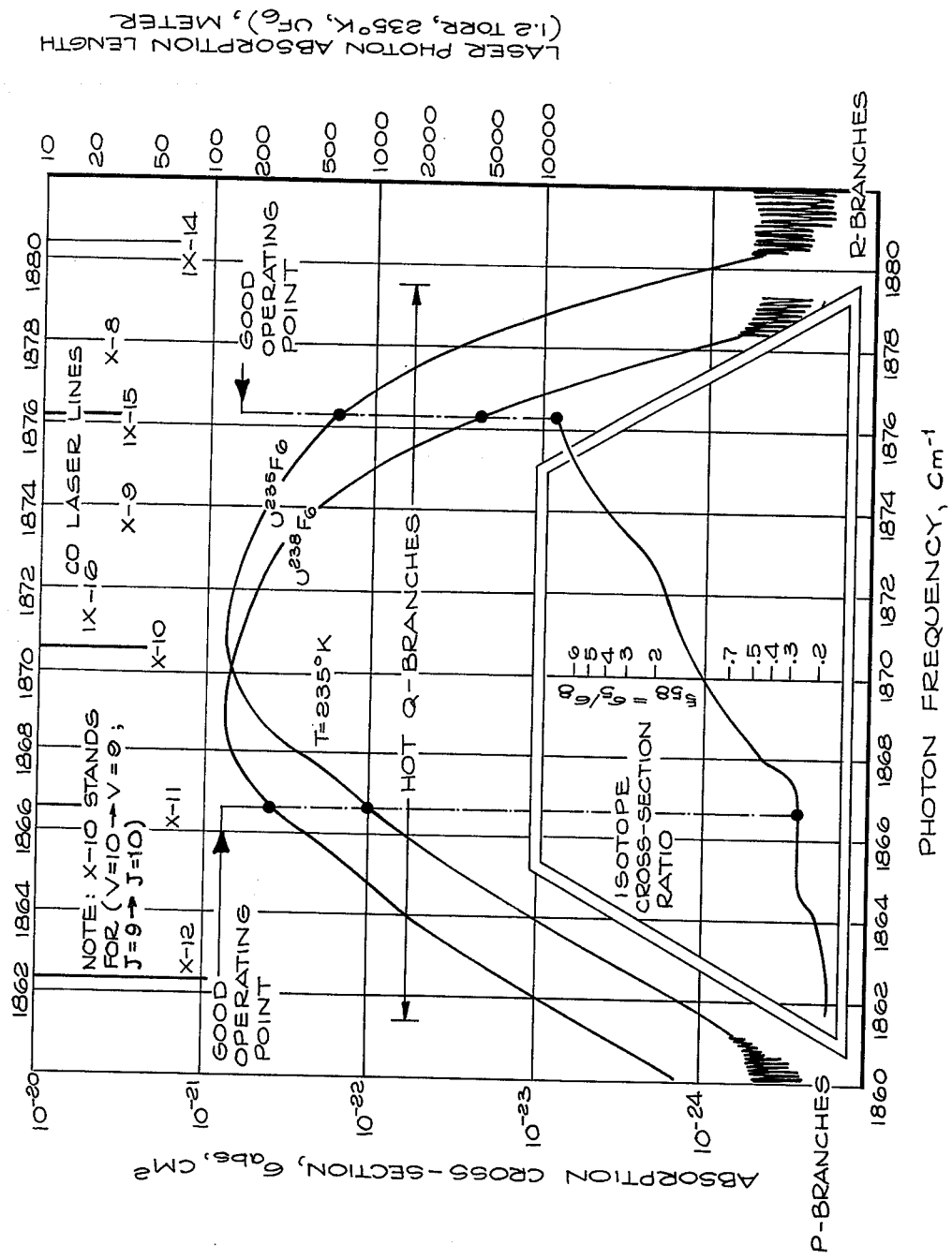
FIG. 4 is a graphical representation of some physical characteristics associated with another embodiment of the present invention.
Figure 5:
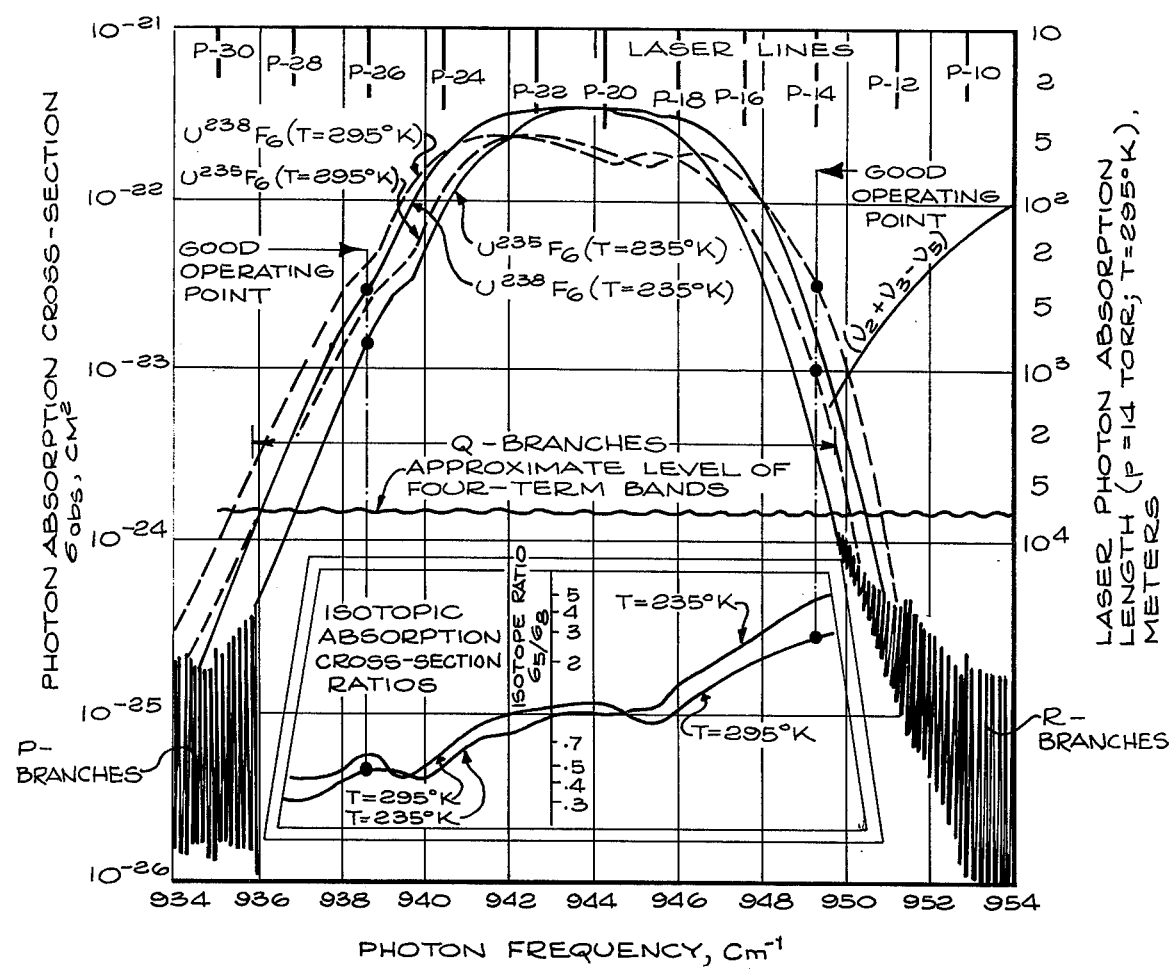
FIG. 5 is still another graphical representation of some physical characteristics associated with another embodiment of the present invention.

For the triple combination bands $3\nu_3$ and ($\nu_3 + \nu_4 + \nu_6$) of UF$_6$, which lie within he emission frequency ranges of the CO and CO$_2$ lasers respectively, the hot Q-branches dominate almost the entire absorption band even at low temperatures, as shown in FIGS. 4 and 5. In this case, reasonably good isotope separation can generally only be achieved at laser frequencies operating on the slopes of the Q-branches envelopes. With the UF$_6$/HCl mixture at a temperature of 235° K for exaple, FIG. 4 indicates that the X-9 ($v = 10 \rightarrow v = 9; J = 8 \rightarrow J = 9$) laser line of CO at a frequency of about 1874 cm$^{-1}$ will give good U$^{235}$ enrichment in the product UF$_5$Cl with an absorption cross-section ratio $\delta_{235}/\delta_{238} \approx 4$. The X-11 ($v = 10 \rightarrow v = 9; J = 10 \rightarrow J = 11$) line of CO can also be used if it is desirable to have U$^{235}$ depletion in the product UF$_5$Cl; the cross-section ratio is in this case $\delta_{238}/\delta_{235} \approx 4$.

Similarly, FIG. 5 shows that the P-14 laser line of CO$_2$ at about 999.3 cm$^{-1}$ may provide good isotope separation, enriching the product UF$_5$Cl in U$^{235}$ with a cross-section ratio of about $\delta_{235}/\delta_{238} \approx 2.75$ at a temperature of 295° K.

Aside from a high cross-section ratio, another parameter favoring economical isotope separation is a reasonable absorption length. For example, the XII-11 Cl$^{35}$F$^{19}$ laser photons used in the Q-slope technique on the fundamental $\nu_3$ band, have an absorption length in UF$_6$ (under optimum separation conditions) of about 3 meters and such operations appear more attractive than operation on the $3\nu_3$ band with X-9 laser photons of CO whose absorption length in UF$_6$ is about 125 meters, or operations with P-14 CO$_2$ laser photons on the ($\nu_3 + \nu_4 + \nu_6$) band of UF$_6$ with a UF$_6$ absorption length of 800 meters as indicated in figures 3, 4, and 5. However, considerations such as reliability, cost, efficiency, or other factors may favor the CO or CO$_2$ laser over the ClF laser under practical operating conditions in spite of the latter's better operating parameters.

FIGS. 3A, 3B, 4, and 5 also illustrate the sensitivity of the Q-edge slopes to temperature. If a particular laser line is near the edge of the Q-branches envelope of a certain desirable UF$_6$ absorption band, a small temperature adjustment can sometimes be used to move the frequency at which the optimum cross-section ratio occurs closer to the available laser line frequency.

The other isotope selective separation arrangement, mentioned above, called the peak-hole or line/hole method, utilizes tuning based upon the characteristics illustrated in FIG. 3, 3A, 3B, 3C, 3D, 3E and 3F. As noted, the absorption band of the U$^{235}$F$_6$ molecules which partially fill the reaction chamber is isotope-shifted with respect to the absorption band of the U$^{238}$F$_6$ molecules contained within the filter cell. At 235° K or other suitable temperature, and at a pressure below 1 Torr, where the rovibrational lines in the P- and R-branches regions of the $\nu_3$ band of UF$_6$ will not be overlapping the lines belonging to U$^{235}$F$_6$ will not occupy the same frequency spaced as the rovibrational lines of U$^{238}$F$_6$, and in many regions of the spectrum strong rovibrational absorption lines of U$^{235}$F$_6$ will substantially fall in the holes in between the lines of the U$^{238}$F$_6$ spectrum. Thus a ClF laser equipped with an internal filter cell containing substantially only U$^{238}$F$_6$ molecules can be operated such that its output frequency will fall substantially in the hole of the U$^{238}$F$_6$ P- or R-branches region. If this laser frequency is further fine-tuned to, or accidentally coincides with a peak of the U$^{235}$F$_6$ spectrum, such a peak-hole coincidence frequency would also promote good isotope separation.

The curves of FIG. 3A represents the absorption spectrum in the 615 to 635 cm$^{-1}$ range for U$^{238}$F$_6$ molecules, that are preponderantly present in the filter gas contained in the filter cell 58 or 58' at a typical temperaure of about 235° K and a pressure of 0.1 to 1 Tor. The curves of FIG. 3B shows the absorption curve of the $\nu_3$ rovibrational band for U$^{235}$F$_6$ molecules under the same conditions as the curves of FIG. 3A. The absorption the curves of FIG. 3B of the U$^{235}$F$_6$ molecules, which are present in the gas mixture contained in the reaction chamber 12 or 12', envelopes essentially the same rovibrational lines as those covered under the curves of FIG. 3A, except that all lines are shifted in frequency upward by approximately 0.68 cm$^{-1}$. The spacing and width of the rovibrational lines under the curves of FIG. 3B is substantially similar to the rovibrational line spacing and width under the curves of FIG. 3A. The curve of FIG. 3E shows an enlargement of a portion of the curves of FIG. 3B at the same frequency interval as that for the curve of FIG. 3D. The curve of FIG. 3F which indicates a desirable "LIOSEP" (an acronym for "Laser Isotope Separation") shows the various possible ultrafine laser resonator lines that are available from within the line envelope of a single lasable transition of the ClF laser (the XII-12 lasable line of $Cl^{37}F^{19}$ in the illustration of FIG. 3C, of which any one is obtainable via fine adjustments in the length of the short-leg laser resonator portion formed by mirrors 40 and 46 in FIG. 1, or 46' and 84' of FIG. 2. In FIGS. 3A, 3B, 3D, 3E and 3F, one such resonator line from the 7XII-(12) transition is shown to be ultra-fine-tuned on a peak in the curve of FIG 3E belonging to $U^{235}F_6$ and a hole in the curve of FIG. 3D belonging to $U^{238}F_6$.

The resonator-allowed laser lines are extremely monochromatic and have widths estimated to be less than $10^{-8}$ cm$^{-1}$. At any one of the rovibrational line frequencies of the $Cl^{35}F^{19}$ or $Cl^{37}F^{19}$ laser, for example the 7XII-(12) line of $Cl^{37}F^{19}$ at 621.770 cm$^{-1}$, the resonator-allowed laser line frequency can be fine-tuned and shifted according to the principles of the present invention by about 0.003 cm$^{-1}$ towards a higher or lower frequency within the ClF pressure-broadened rovibrational laser linewidth which, under typical operating conditions of p=25 Torr and T=200° K, is approximately 0.006 cm$^{-1}$ wide. Thus, the Clf laser line frequency at 621.770 cm$^{-1}$ can be varied by fine tuning which, as mentioned before, may be achieved by small changes in the mirror spacing between mirrors 40 and 46 of FIG. 1 or 84' and 46' of FIG. 2 in the short-leg of the laser resonator system. Since the effective average rovibrational line spacing is on the order of 0.0006 cm$^{-1}$ and in the $UF_6$ P- and R- branches regions, such ultra-fine-tuning can indeed move the laser resonator line from a peak absorption to a hole or vice versa in the $UF_6$ spectrum.

As stated, the filter cell placed inside laser cavity (in the long leg of the resonator), will insure that only those resonator lines are allowed to lase and be emitted in the photon beam 18 which fall substantially between the rovibrational absorption lines of $U^{238}F_6$. To force the filtered laser line frequencies in the photon beam 18 to coincide with a peak in the $U^{235}F_6$ absorption, the double resonator system shown in FIGS. 1 and 2 is used and the laser resonator frequency is fine-tuned to a place within the pressure-broadened rovibrational emission line envelope where $U^{235}F_6$ is observed experimentally to absorb most and $U^{238}F_6$ the least. The resonator frequency is then locked there by means of the feed-back position control system 88 and 92 of FIG. 1 or 88' and 92' of FIG. 2. The optimum frequency position is determined by use of a beam splitter 86 of 86', which passes laser output photons through two small absorption cells filled with $U^{235}F_6$ and $U^{238}F_6$ respectively at $p \approx 0.1$ Torr which form part of the meter 88 or 88'. The difference in absorption between the two auxiliary absorption cells is continuously monitored by a photo sensor in 88 or 88' and any drifting from the maximum difference absorption will be electronically sensed and the signal amplified to drive the piezoelectrically operated mirror micropositioner 92 or 92'. The micropositioner 92 or 92' causes changes in the resonator spacing of the short resonator by axial translations of the end mirror 40 or 46' such that the exact laser resonator frequency is driven back to the value where a maximum absorption difference exists.

The pressures given in the above example are only illustrative and good separation at other pressures may be obtained as well. The main consideration in choosing a pressure for operation according to the peak-hole method is that the rovibrational linewidths in the P- and R- branches regions are not too broad so that they substantially overlap. This means that the value of the pressure, in proportion to which the rovibrational linewidths vary approximately linearly, must be chosen so that the rovibrational linewidth does not substantially exceed the rovibrational line spacing.

Of course, in some applications the $U^{235}$ and $U^{238}$ isotopes are interchanged, the filter gas will contain a gas comprised preponderantly of $U^{235}F_6$ molecules instead of $U^{238}F_6$ molecules and all statements regarding $U^{235}$ and $U^{238}$ should be permutated.

In general, peak-hole operation requires more stringent laser frequency controls than Q-slope operation. However, higher cross-section ratios and thus higher isotope enrichment is possible usually by the peak-hole method. If achievement of the maximum possible absorption cross-section ratio is not essential, as may be the case in some applications, the Q-slope method is often preferred. In the Q-slope method, a higher operating pressure can usually be tolerated than in the peak-hole method, and optimum pressures can be selected on the basis of optimum chemistry, quantum efficiency, and the temperature-dependent vapor-pressure of $UF_6$, instead of the consideration for open spaces between rovibrational lines. The isotope absorption cross-section ratio for the $3\nu_3$ band of $UF_6$, due to the isotope shift, is, for example, on the order of 4 on the edges of the solid Q-branches regions (at a temperature of 235° K or less) which is adequate for producing low enriched uranium fuel for nuclear reactors in one stage. For the $(\nu_3 + \nu_4 + \nu_6)$ band, a maximum ratio of about 2.75 is attainable (at a temperature of 265° K or lower), while the $\nu_3$ fundamental band, when considered for the Q-slope method, is capable of yielding a ratio of 5 (at 235° K or below).

In addition to considerations for insuring low thermal reaction rates in the lower state, the operating temperatures of the $UF_6$ gas in the filter cell 58 and 58' and the reaction chamber 12 and 12' are chosen such that:

A. the $UF_6$ remains in a gaseous state;

B. a good absorption cross-section ratio exists in the frequency region of interest; and C. line-broadening is less than line spacing, for those embodiments utilizing the peak-hole method.

In the illustrative example given above where the temperature of the $UF_6$ in the filter cell and reaction chamber was selected to be 235° K, the temperature is high enough to maintain $UF_6$ in a gaseous state at a partial pressure of 1 Torr or less. The other gases in the reaction chamber, HCl and HF, are also gaseous at 235° K, if their partial pressures do not exceed 1,000 and 60 Torr respectively, while the product gas $UF_5Cl$ will condense out at a partial pressure of about 0.01 Torr at 235° K.

Of course, any other temperatures instead of the ones used in the above illustration may be employed provided favorable conditions for isotope separation can be maintained. For example, operation of the reaction chamber at a pressure of 6 Torr $UF_6$ + 24 Torr HCl at a temperature of about 290° K, with a CO laser tuned to absorb at the maximum absorption cross-section ration on the Q-slope of the $3\nu_3$ band of $UF_6$, may provide isotope separation with a cross-section ratio of about 2.5 which may be adequate in some applications. The advantage of operating at higher pressures, from the processing viewpoint, is, of course, a higher material throughput.

For the isotope separation of $U^{235}F_6$ and $U^{238}F_6$, the laser 38 of FIG. 1 may thus be a ClF laser which can operate on a number of lasable rovibrational line frequencies of the $Cl^{35}F^{19}$ molecules in the 614 to 635 cm$^{-1}$ region as shown by curve C of FIG. 3. The strongest lines emitted by a liquid-nitrogen-cooled, flowing, electric-discharge-pumped ClF laser are from the $v = 13$ to $v = 12$, the $v = 12$ to $v = 11$ and the $v = 11$ to $v = 10$ transitions. The rotational lines with $J = 11 \rightarrow J = 12$ are usually at the peak of the rovibrational band contours if the ClF temperature is about 200° K. The linewidts of the lasable rovibrational lines of ClF are typically 0.006 cm$^{-1}$ while the laser resonator lines are on the order of $10^{-8}$ cm$^{-1}$ as shown in curve F of FIG. 3, which is an enlargement of one of the lasable rotational lines of ClF in the same frequency interval as that for the curves of FIG. 3D and FIG. 3E. Clearly the laser resonator lines may be considered true monochromatic lines.

For operations on the $3v_3$-band of UF$_6$ in the 1860 to 1880 cm$^{-1}$ region of the spectrum, the laser 38 of FIG. 1 could be an electric-discharge-pumped, liquid-nitrogen-cooled, flowing carbon monoxide (CO) laser. This laser has strong emisson lines from $J = 11 \rightarrow J = 12$, $J = 10 \rightarrow J = 11$, $J = 9 \rightarrow J = 10$, $J = 8 \rightarrow J = 9$, and $J = 7 \rightarrow J = 8$ of the $v = 10 \rightarrow v = 9$ vibrational band, and $J = 15 \rightarrow J = 16$, $J = 14 \rightarrow J = 15$, and the $J = 13 \rightarrow J = 14$ from the $v = 9 \rightarrow v = 8$ vibrational band of CO in the region between 1860 and 1880 cm$^{-1}$, as shown in the upper portion of FIG. 4.

Finally, the laser 38 of FIG. 1 could be an electric-discharge-pumped, water-cooled, flowing CO$_2$ laser which can be lased on all lines between P-2 and P-38 and R-2 and R-38 of the P- and R- branches of the $v_3 \rightarrow v_1$ vibrational transition band of CO$_2$, stretching from 927 to 985 cm$^{-1}$. The CO$_2$ laser emission lines between P-10 and P-30, which are spaced approximately 1.82 cm$^{-1}$ apart, fall in the 935-953 cm$^{-1}$ region of the $(v_3 + v_4 + v_6)$ absorption band of UF$_6$ as shown in the upper part of FIG. 5. Additonal UF$_6$ absorption bands in the 927-985 cm$^{-1}$ region of the CO$_2$ laser are the $(v_2 + v_3 - v_5)$, the $(v_3 + v_5 + v_6)$, and the $(v_2 + v_3 - v_4)$ bands centered approximately at 958, 968, and 972 cm$^{-1}$ respectively. These latter three combination bands of UF$_6$ may also be utilized for isotope separation by choosing a suitable CO$_2$ laser line. Additional CO$_2$ laser lines are emitted in the 1010 to 1080 cm$^{-1}$ region from the $v_3 \rightarrow 2v_2$ vibrational transition of CO$_2$. Again isotope separation of UF$_6$ may be possible using one of the CO$_2$ laser lines in the 1010 to 1080 cm$^{-1}$ region of the spectrum.

For operation of the double-combination band $(v_2 + v_3)$ of UF$_6$ centered at 1292 cm$^{-1}$, an electron-discharge pumped gas-dynamic or chemical BF laser may be used, which lases in the 1150 to 1300 cm$^{-1}$ frequency range by the same principles as the CO laser. Some laser lines of the BF laser may also coincide with a portion of the $(v_2 + v_3)$ band of UF$_6$, centered at 1157 cm$^{-1}$. The $O^{18}C^{12}S^{36}$ laser and CS laser have also laser emission lines that coincide with the $(v_2 + v_3)$ band of UF$_6$. A closed-cycle electron-discharge-pumped gas-dynamic $O^{18}C^{12}S^{36}$, $O^{16}C^{13}S^{36}$, $O^{18}C^{13}S^{34}$, or $O^{18}C^{13}S^{36}$ laser with lasable emissions between 1150 and 1200 cm$^{-1}$ from $v_3 \rightarrow v_1$ transitions, operates on the same principles as the CO$_2$ laser. A key to the successful operation of a CS or OCS laser is the purification of OCS and CS so that H$_2$S contamination is less than 1 part per million. A chemical CS laser wherein CS is produced by dissociation of OCS or CS$_2$ or via a chemical reaction, may be most efficient if such a laser is needed for operations on the $(v_2 v_3)$ band of UF$_6$. An efficient electron-discharge-pumped, gas-dynamic CS laser may however also be developed for this purpose. The CS laser with emissions between 1050 and 1200 cm$^{-1}$ operates on the same principles as the CO laser.

The values for the vibrational frequencies, the isotope shifts and the average line spacings in UF$_6$ used in the above illustrations are only approximate, and have not at the present state of the art, been measured accurately.

The fundamental spacing of the rovibrational lines in the P- and R-branches of each hot band of say the $v_3$ vibration of UF$_6$ is not constant but varies slowly (because of a quadratic term), increasing away from band-center in the P-branch and decreasing away from band-center in the R-branch. As a result, some rovibrational lines of the $v_3$ vibration band of $U^{235}F_6$ will always fall between the rovibrational lines of $U^{238}F_6$ in certain portions of the P- and R-branches regions. Because of the non-constant line spacing and the non-constant hot-band shifts, there is also no chance that all lines of the $U^{235}F_6$ band would accidentally overlap all lines of the $U^{238}F_6$ band if the isotope shift is an integral multiple of the line spacing. Since most infrared lasers such as ClF allow the lasing on some thirty or more possible rovibrational spectral lines separated by intervals with a spacing value typically in the range of 0.5 to 2.5 cm$^{-1}$, certain ones of these laser lines are sure to fall substantially in between the peaks of the P- or R-branches region of $U^{238}F_6$ and on or near a peak absorption of $U^{235}F_6$ as illustrated by the curves of FIGS. 3D, 3E and 3F.

In applications where the Q-slope spectral technique is employed instead of the peak-hole technique, a single resonator system with a grating at one end and an output partial mirror at the other is usually adequate since laser frequency fine-tuning and locking, which is possible only with a double resonator system, is not necessary. A filter cell is also usually not needed. Coarse-tuning with the grating of the single resonator system will be sufficient to force lasing at a desirable frequency on a Q-slope.

Summarizing peak-hole spectral operations where filter-tuning and fine-tuning with a double resonator system is employed there are basically three steps:

1. the grating mirror in the double resonator system is set to select a single desirable lasable ClF line;
2. the filter cell forces lasing action on those resonator lines within this lasing ClF line for which $U^{238}F_6$ is least absorptive; while
3. final ultra-fine tuning to a $U^{235}F_6$ peak of a particular resonator line within the lasable ClF rovibrational line is done by adjustments in the spacing of the mirrors in the short-leg, mediated by absorption difference measurements and feedback control. It has been found that situations exist where coercion by the filter cell to have lasing on a resonator line coinciding with a hole in the spectrum of $U^{238}F_6$ will cause also coincidence or near-coincidence with a peak in the spectrum of $U^{235}F_6$. In this case only the filter cell is needed and the fine-tuning double-resonator system and feed-back control system are not needed.

Since the absorption cross-section of the other isotopic molecule, say $U^{238}F_6$, can never be completely zero, there will also be a certain number of $U^{238}F_6$ molecules raised to the upper rovibrational energy state by the laser beam which will also react with the hydrogen chloride. This produces $U^{238}F_5Cl$ molecules which, of course, make the U-235 enrichment of the UF$_5$Cl product always less than ideal (100%) and keep it proportional to the cross-section ratio or limiting enrichment factor. In addition to direct laser excitation of $U^{238}F_6$, excited $U^{238}F_6$ may be formed by collisional vibration-vibration (VV) transfer from laser excited $U^{235}F_6$. This so-called VV "isotope scrambling" has been found to be slow however if HCl is used as competing (rapid) reactant, and is partially offset by isotope scrambling in the opposite direction, that is from $U^{238}F_6$ to $U^{235}F_6$.

In addition to the $\nu_3$, $3\nu_3$ and $(\nu_3 + \nu_4 + \nu_6)$ rovibrational bands which fall in the frequency region of, respectively, the ClF, and CO and $CO_2$ laser, there exists, for uranium hexafluoride, many other rovibrational bands in other frequency regions where other lasers emit.

Table I below shows several additional $UF_6$ rovibrational absorption band center frequencies and laser frequencies closest to them available from presently known lasers. Some of the laser frequencies listed in Table I are "doubled" frequencies which can be obtained by adding a frequency doubler 76 inside a laser resonator system as described before. The natural frequency of the laser is also listed in those cases. As seen in Table I, the doubled frequency provides the desired laser photon frequency in some cases for utilization with $UF_6$. Of course, the lasers may be operated either continuously or they may be pulsed, and their beams may be focused or unfocused to provide any desired photon intensity.

A table similar to Table I can be prepared for the vibronic energy level changes of $UF_6$. The laser, in such a case, must be selected to provide, ultimately, a photon frequency corresponding to the desired vibronic energy level changes.

In addition to the ClF, CO, $CO_2$, $SO_2$, BrF, BBr, CS, BF, $F_2O$, $Cl_2O$, $OsO_4$, BCl, HCP, OCS, $H_2O$ and HF lasers shown in Table I, such lasers as DF, $I_2$, NO, HCl, $CS_2$, $H_2Se$, HCN, $N_2O$, $NH_3$, $BCl_3$, $SF_6$, $UF_6$, and other molecular lasers as well as argon ion or excimer, krypton ion or excimer, xenon ion or eximer, iodine, dye, and other lasers, for example, may also be utilized. The particular photon frequency output, either undoubled, doubled, shifted, or tuned to each of these lasers may be utilized either directly to provide the selective excitation of the predetermined isotope molecule contained within the reaction chamber 12 or 12', or indirectly after frequency shifting by means of the conversion crystal 72 and idler radiation source 74. The selection of the particular laser and the particular frequency line or lines of that laser will, of course, depend upon the photon-inducible rovibrational or vibronic energy transitions of the mixture of chemically identical but isotopically different molecules contained within the reaction chamber 12 or 12'. Similarly, the filter gas or material will also be selected to remove substantially, or suppress, photons associated with the energy absorption of the other chemically identical but isotopically different molecules so that the beam of filtered photons is substantially pure in just the photons having energy in the frequencies corresponding to strong transitions of the predetermined isotopic molecules and weak or no transitions of the other isotopic molecules.

| LASER TYPE (LASER TRANSITION) | APPROX. CENTER FREQUENCY OR RANGE OF LASER LINE FREQUENCIES (cm$^{-1}$) | | CENTRAL FREQUENCY OF $UF_6$ ROVIBRATIONAL ABSORPTION BAND (cm$^{-1}$)* |
|---|---|---|---|
| $CO_2$ $(\nu_3 \rightarrow \nu_1)$ | 920 – 989 | | 953.6 $(\nu_3 + \nu_4 + \nu_6)$ |
| $CS_2$ $(\nu_3 \rightarrow \nu_2)$ | 1120 – 1160 | (stimulated Raman) | 1157 $(\nu_2 + \nu_3)$ |
| $SO_2$ $(\nu_1 \rightarrow \nu_2)$ | 610 – 650 | | 624.4 $(\nu_3)$ |
| $H_2O$ (rotational line) | 302.76 Doubled 605.52 | | 624.4 $(\nu_3)$ |
| $F_2O$ $(\nu_3 \rightarrow \nu_2)$ | 600 – 640 | | 624.4 $(\nu_3)$ |
| $Cl_2O$ $(\nu_3 \rightarrow \nu_2)$ | 620 – 660 | | 624.4 $(\nu_3)$ |
| $OsO_4$ $(\nu_1 \rightarrow \nu_4)$ | 620 – 660 | | 624.4 $(\nu_3)$ |
| $O^{18}Cl^{12}S^{36}$ $(\nu_3 \rightarrow \nu_1)$ | 1150 – 1200 | | 1157 $(\nu_2 + \nu_3)$ |
| HCP $(\nu_3 \rightarrow \nu_2)$ | 580 – 624 | | 624.4 $(\nu_3)$ |
| HF (5% $H_2$-95% $ClF_4$) (rotational lines) | 692.5 | | 676.6 $(\nu_3 + \nu_4 - \nu_6)$ or $(\nu_2 + \nu_6)$ |
| CO | 1850 – 1990 | | 1870 $(3\nu_3)$ |
| CS | 1050 – 1200 | | 1157 $(\nu_2 + \nu_3)$ |
| BCl | 610 – 670 | | 624.4 $(\nu_3)$ |
| $Cl^{34}F$ | 600 – 650 | | 624.4 $(\nu_3)$ |
| $Cl^{37}F$ | 600 – 650 | | 624.4 $(\nu_3)$ |
| $Br^{79}F$ | 530 – 630 | | 624.4 $(\nu_3)$ |
| $B^{10}Br^{79}$ | 530 – 630 | | 624.4 $(\nu_3)$ |
| $B^{10}F$; $B^{11}F$ | 1150 – 1300 | | 1292 $(\nu_1 + \nu_3)$; 1157 $(\nu_2 + \nu_3)$ |
| Heated $SF_6$ pumped by 10,6 μm $CO_2$ laser photons $(2\nu_3 + \nu_h \rightarrow \nu_2 + \nu_4 + \nu_h)$ | 623 – 640 | | 624.4 $(\nu_3)$ |
| $CO_2$ pumped by 7.78 μm laser photons or electric discharge $(2\nu_2 \rightarrow \nu_2)$ | 600 – 630 | | 624.4 $(\nu_3)$ |

*Most $UF_6$ bands extend over a range from about −10 cm$^{-1}$ to about +10 cm$^{-1}$ from the central frequency.

As noted above, to produce an enrichment of $U^{235}$ much greater than that naturally occurring in uranium is one of the major applications for utilization of the present invention. However, the invention is not limited to the utilization of uranium hexafluoride as the mixture of chemically identical but isotopically different molecules. Rather, many other uranium compounds may be utilized advantageously to provide the enriched $U^{235}$. In general, it has been found in some applications to be advantageous to work with uranium containing molecules in which all the atomic species except uranium are mono-isotopic. Mono-isotopic elements, of course, are those in which only one stable isotope exists in nature. Thus, the isotopic differences will be provided by the different isotopes of uranium, namely the $U^{235}$ and $U^{238}$. Further, it is generally advantageous to have a uranium-bearing molecular compound with a low melting point and a low boiling point so that it may be maintained as a fluid, that is, in the liquid or gaseous state with the possibility of obtaining the reaction product in an easily separable state such as a different chemical state which can be separated by differential freezing or distillation from the original reactant mixture, or a different physical state, such as the solid state which would precipitate out of the reactant gas mixture and thus be separated from it. Low operating temperatures are desired in general because of the broadening of the spectral absorption lines and bands as noted above.

Further, in order to obtain large isotope shifts in the frequency of the photon absorption bands between the $U^{235}$ containing molecules and the $U^{238}$ containing molecules, it has been found that the combined mass of the other atoms contained within the molecules should be as high as possible. Accordingly, in addition to $UF_6$, it has been found that, for example, the molecules of $UCl_6$, $UBr_6$, $UF_5Cl$, $UF_5I$, $UF_5Br$, $UI_4$, $UCl_4$, $UI_3$, $UI_2F_2$, $UClF_3$, $UIF_3$, $UO_2$, $US_2$, $U(BH_4)_4$, uranium phosphides, uranium arsenides, uranium antimonides, uranium selenides, uranium tellurides, and mixed uranium halides other than those already mentioned are also molecules that may be advantageously utilized in the practice of the present invention to separate the $U^{235}$ containing molecules from the $U^{238}$ containing molecules.

Additionally, certain other elements, in addition to uranium, may equally well be utilized in the practice of the present invention to provide a separation of one or more of a predetermined isotopic molecule from a mixture of chemically identical but isotopically different molecules. For example, Table II lists the element, the molecule and the isotopes thereof that may be separated to provide an enrichment of that isotope according to the principles of the present invention. Of course many other isotopes besides these shown in Table II may be separated by the principles of the present invention. Particularly any other hexafluoride $XF_6$, such as $SF_6$, $SeF_6$, $TeF_6$, $TcF_6$, $RuF_6$, $RhF_6$, $WF_6$, $OsF_6$, $PtF_6$, $NpF_6$, $XeF_6$, and $KrF_6$, where it is desired to separate the various isotopes of the atom X, can be readily handled by the methods described herein.

TABLE II

| Element | Molecule | Isotopes |
|---|---|---|
| Chlorine (Cl) | $ClF$; $ClF_3$; $Cl_2O_7$ | Cl-35 |
| Copper (Cu) | $CuI$; $CuN_3$ | Cu-63; Cu-65 |
| Gallium (Ga) | $GaI_3$; $GaCl_3$ | Ga-69; Ga-71 |
| Bromine (Br) | $BrF$; $BrF_3$; $BrF_5$ | Br-79; Br-81 |
| Molybdenum (Mo) | $MoF_6$ | Mo-92; Mo-94; Mo-95; Mo-96; Mo-97; Mo-98; Mo-100 |
| Silver (Ag) | $AgN_3$ | Ag-107; Ag-109 |
| Antimony (Sb) | $SbF_3$; $SbF_5$; $SbH_3$ | Sb-121; Sb-123 |
| Lanthanium (La) | $LaI_3$; $LaF_3$ | La-138; La-139 |
| Euproium (Eu) | $EuI_2$ | Eu-151; Eu-153 |
| Rhenium (Re) | $ReF_6$ | Re-185; Re-187 |
| Iridium (Ir) | $IrF_6$ | Ir-191; Ir-193 |
| Thallium (Tl) | $TlF$; $TlNO_3$ | Tl-203; Tl-205 |
| Plutonium (Pu) | $PuF_6$ | Pu-236; Pu-238; Pu-239 Pu-240; Pu-241; Pu-242 |

Although hydrogen chloride has been utilized in the example given above as the chemically-reactive agent to provide a chemical reaction with $UF_6$, many other chemically-reactive agents may also be utilized. For example, HBR, HI, $H_2$, $I_2$, $Cl_2$, $Br_2$, $NH_3$, $CH_4$, various gaseous hydrocarbons, and He, Ne, Ar, Kr, Xe, $N_2$, $O_2$ may be used in place of HCl, either singly or in any combination, to promote the desired reaction of $UF_6$, or to promote reaction of other isotopic compounds in embodiments employing gaseous halide compounds or other gaseous compounds of other isotopes to be separated such as those shown in Table II.

For example, the following isotope-selective laser-induced reactions may also provide an economic method for isotope separation of Uranium:

$$UF_6^{**} + H_2 \rightarrow UF_4 + 2HF \tag{4}$$

$$2UF_6^{**} + H_2 \rightarrow 2UF_5 + 2HF \tag{5}$$

In these reactions, solid $UF_4$ or $UF_5$ is precipitated out such that the precipitated $UF_4$ or $UF_5$ is either enriched or depleted in $U^{235}$. The isotope-selective laser excitation and reaction is achieved in this case by pulsing and focusing of the incident laser beams so that multi-photon absorption is promoted. The highly excited $UF_6$ ($UF_6^{**}$) is collisionally dissociated by $H_2$ which simultaneously removes the nascent F atoms by reacting with them. Usually light molecules, such as $H_2$, best promote such dissociations of highly excited $UF_6$ molecules.

Both the agent, as well as the particular isotopic halide compound with which the agent must significantly react, or whose chemical reaction it must promote when the halide compound is in the excited state, determines the pressure and temperature at which the halide compound and chemically-reactive agent are mixed in the reaction chamber 12 or 12'. The pressure and temperature of the mixture in chamber 12 or 12' is selected to provide virtually no chemical reaction of the halide compound and the reactive agent in the initial mixture state, and the reaction occurs only after the halide compound is excited by laser irradiation. Thus, in selecting particular combinations of isotopic compounds and reactive agents, detailed chemical reaction kinetics parameters should be known for the pairs of reactants in order to determine optimum mixing pressures and temperatures. In some applications, both the isotopic molecule whose isotopes are to be separated and the chemical coreactant may be laser excited, each by the same laser or by two different lasers. However, the laser-excited chemical coreactant should not be able to react significantly with non-laser-excited isotopic molecules, else isotope separation will not be good.

For efficient isotope separation, it is important that the vibrational-to-translational (VT) and vibrational-vibrational (VV) relaxation rates of the laser-excited vibrational states be slow in comparison with the chemical reaction rate by which the desirable isotope is removed. For example, for $UF_6$ it has been found experimentally that the collisional VT and VV de-excitation rates of the $\nu_3$ vibration of $UF_6$ are sufficiently slow, and that promotion of a reaction of $UF_6$ with HCL to form $UF_5Cl$ can be made sufficiently fast, to cause the quantum efficiency of the laser-excited photochemical reaction:

$$UF_6^* (\nu_3) + HCl \rightarrow UF_5Cl + HF \tag{6}$$

to be about 25% at room temperature. Similar conditions should prevail for other isotopic molecules using other chemical reactants.

In the examples given heretofore, pure rovibrational excitations of $UF_6$ and other isotopic compounds were primarily considered. However, a vibronic excitation of $UF_6$, that is, an excitation in which there is both a change in the electronic state as well as in the vibrational state, may sometimes also be considered. Examples are the $UF_6$ vibronic excitation absorption or emission bands centered at a frequency of approximately 27,410 cm$^{-1}$, 27,490 cm$^{-1}$, and 28,415 cm$^{-1}$, in the near-ultraviolet. Lasers with outputs in these bands are the xenon-ion laser emitting a frequency of 27,400 cm$^{-1}$, and the argon-ion laser emitting a frequency of 27,485 cm$^{-1}$, and a frequency of 28,465 cm$^{-1}$. Similarly, the krypton-ion laser emissions at a frequency of 28,480 cm$^{-1}$ and 28,000 cm$^{-1}$ may also be employed in connection with the excitation of the $UF_6$ vibronic absorption bands centered around 28,415 cm$^{-1}$ and 28,080 cm$^{-1}$. Finally tunable dye and iodine lasers or noble gas eximer lasers may be used whose frequencies can be tuned throughout the ultraviolet absorption spectrum of $UF_6$.

DESCRIPTION OF ISOTOPE SEPARATION PLANT FOR THE ENRICHMENT OF URANIUM ISOTOPES

Figure 6:
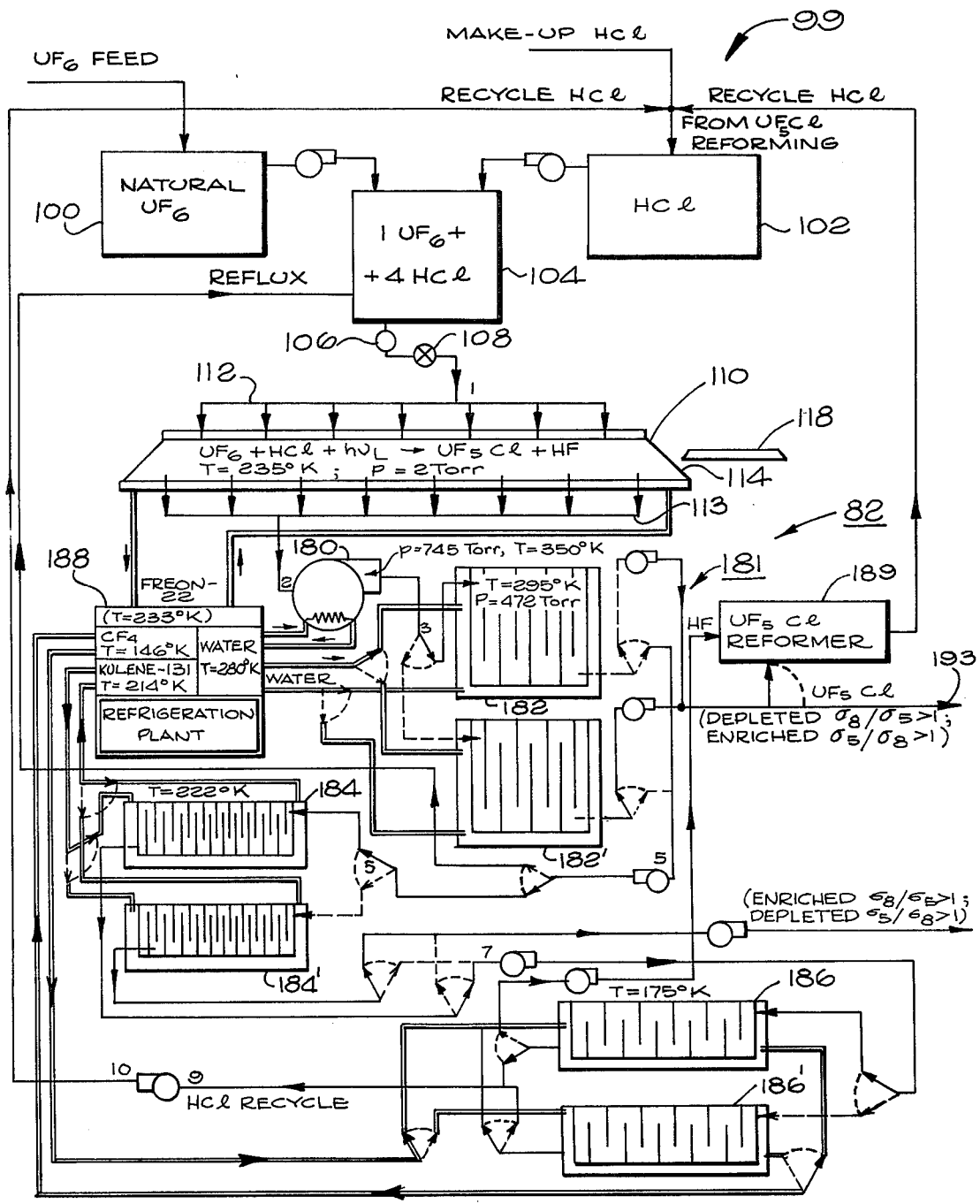
FIG. 6 is a schematic and flow diagram of an operational plant according to the principles of the present invention showing the removal of product and waste, and the recycling or unused chemicals in one embodiment of the present invention in which the product is gaseous isotope-enriched $UF_5Cl$.

In FIG. 6 there is a schematic diagram and flow chart for a uranium laser isotope separation plant generally designated 99 operating on the principles of the present invention. The plant is capable of enriching natural uranium from the naturally occurring 0.7% to a range between 2.5% and 7% (enrichment factor of approximately 4 to 10) or higher, in one step, at a cost estimated to be one hundred to one thousand times less than the cost incurred for achieving such a range of enrichment factors in a diffusion plant utilizing, for example, the diffusion process. Natural $UF_6$ in a gaseous state from tank 100 is mixed with gaseous HCl from reservoir 102 in a mixing tank 104 from which it is pumped by pump 106, through shut-off valve 108 and into the reaction chamber 110 through manifold 112. Reaction chamber 110 is provided with a suitable window 114 for transmitting the desired laser radiation therethrough for absorption in the chamber 110 by the preselected isotopic-molecule, either $U^{238}F_6$ or $U^{235}F_6$, depending upon the frequency content of the laser photons.

Means 118 for producing laser photons at a frequency corresponding to high isotopic absorption ratios of $U^{235}F_6$ to $U^{238}F_6$ or, if desired, $U^{238}F_6$ to $U^{235}F_6$ are described above.

The preferred laser is a ClF, BF, OCS, CS, CS$_2$, CO, or CO$_2$ laser, as discussed above, while the preferred reaction mixture is $UF_6$ with HCl in a mole ratio between 1/20 and 1/1, a typical mixture mole ratio being $UF_6/HCl = \frac{1}{4}$. Instead of HCl, the halides HBr or HI may also be used. Typical total pressure of $UF_6$/HCl mixture is 2 Torr while the temperature is typically 235° K. However, pressures and temperatures above or below these values selected upon the principles set forth above, may also be used to give efficient separation. The nominal 2 Torr pressure and 235° K temperature of the gas mixture can be attained by standard means used in the chemical process industry such as refrigeration, nozzle expansion, etc., just prior to entry of the mixture into chamber 110.

Upon laser irradiation of the $UF_6$/HCl mixture in chamber 110, the chemical reactions:

$$U^{235}F_6^* (\nu_3) + HCl \rightarrow U^{235}F_5Cl + HF\ (\nu = 1\ \text{or}\ 2) \quad (7)$$

$$U^{238}F_6^* (\nu_3) + HCl \rightarrow U^{238}F_5Cl + HF\ (\nu = 1\ \text{or}\ 2) \quad (8)$$

occur with a typical quantum efficiency of about 25% at the nominal pressure of 2 Torr and temperature of 235° K. Since the rate of absorption of laser photons by the preselected isotope $U^{235}F_6$ (or $U^{238}F_6$ if this approach is selected) is higher, the isotope ratio $U^{235}F_5Cl/U^{238}F_5Cl$ (or $U^{238}F_5Cl/U^{235}F_5Cl$) will be higher than the original isotope ratio $U^{235}F_6/U^{238}F_6$ (or $U^{238}F_6/U^{235}F_6$) of the mixture in the mixing tank 104. Typical hold-up times of the mixture for a ClF laser irradiation with 1000 watts through a chamber 110 of 35 cm radius and 5 meter length is about 0.024 seconds. For irradiation with a CO laser at 1 kilowatt through a chamber 110 of 35 cm radius and 280 meter length, the hold-up time might typically be 29 seconds, while irradiation with a CO$_2$ laser through a chamber 110, 420 meters long and 35 cm in diameter requires typically a hold-up time of 198 seconds. Higher or lower hold-up times, using different laser power levels and/or two or more lasers, and/or different operating pressures and temperatures with other chamber radii and lengths may also be profitably used.

Figure 7:
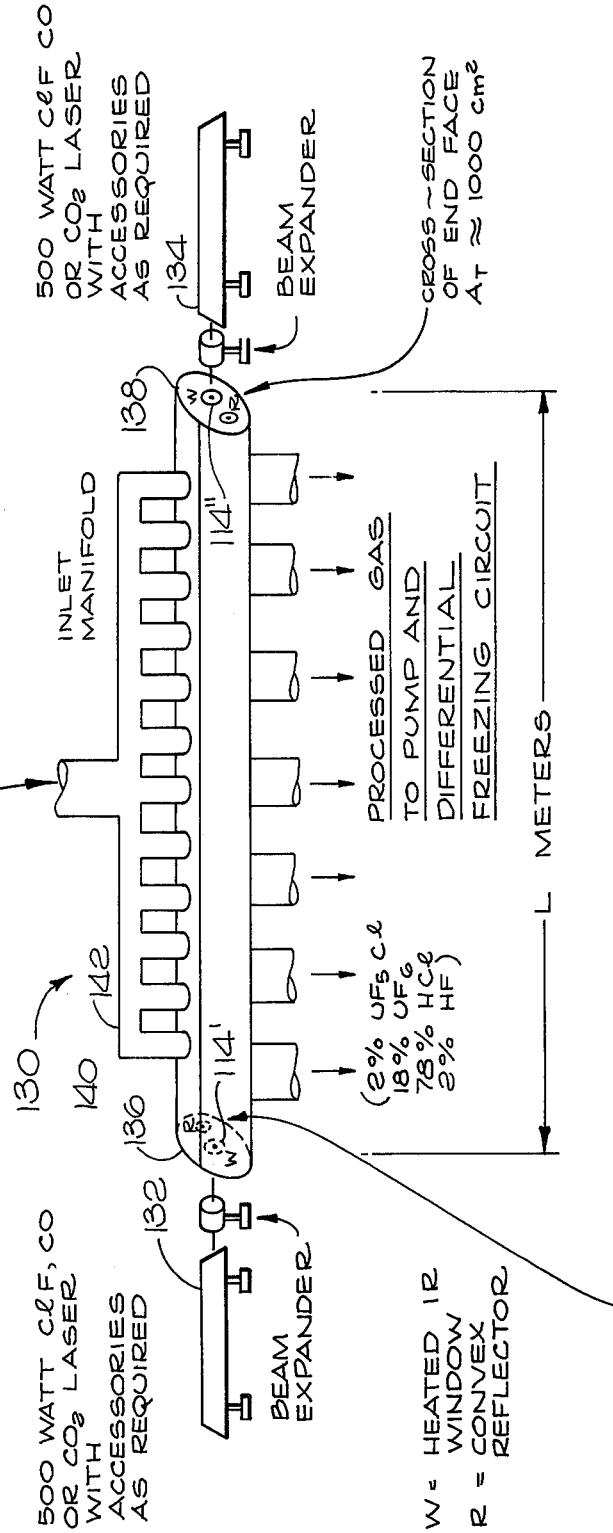
FIGS. 7 and 8 are schematic representations of structure according to the principles of the present invention useful in an isotope separation operation.

A typical arrangement 130 using two 500 watt ClF, BF, OCS, CS, CS$_2$, CO, or CO$_2$ lasers 132 and 134, one at each end 136 and 138, respectively, of a chamber 140 of 1000 cm$^2$ cross-section through windows 114' and 114" is shown in FIG. 7. If a ClF laser is used in the arrangement of FIG. 7, typical process parameters are as follows: $UF_6$ Feed Rate through inlet manifold 142 = 0.21 moles/sec; Reaction Chamber Length = 5 meters; $UF_6$ pressure = 0.12 Torr; temperature = 210° K; hold-up time = 0.024 sec. If a CO laser is used instead, the $UF_6$ feed rate is 0.07 moles/sec. and the reaction chamber parameters are: length = 280 meters; $UF_6$ pressure $\approx$ 0.95 Torr; temperature = 235° K; hold-up time $\approx$ 29 seconds. Finally, in the case that a CO$_2$ laser is employed, the $UF_6$ feed rate is 0.14 moles sec, while the reaction chamber parameters are: length = 420 meters; $UF_6$ pressure = 10 Torr; temperature = 265° K; hold-up time $\approx$ 198 seconds. In all cases, the "cut" is taken to be about 10%, that is the ratio of $UF_5Cl$ produced to $UF_6$ fed is approximately 0.1. A molar ratio of HCl/$UF_6$ of 4 is assumed to be nominal, but any ratio between 1 and 10 may be used.

For the ClF laser an effective enrichment factor of about 6 can be obtained using the Q-edge spectral approach, while a factor of about 10 to 15 may be obtained if the line-hole technique is applied to the $\nu_3$-band, as described above. For the CO and CO$_2$ lasers, Q-edge operations appear, at the present time, to have the most promise. An effective enrichment factor of approximately 3.5 may be obtained with the CO laser operating on the $3\nu_3$ band of $UF_6$ and a factor of about 1.5 is possible if the CO$_2$ laser is used operating on the ($\nu_3 + \nu_4 + \nu_6$) band.

Figure 8:
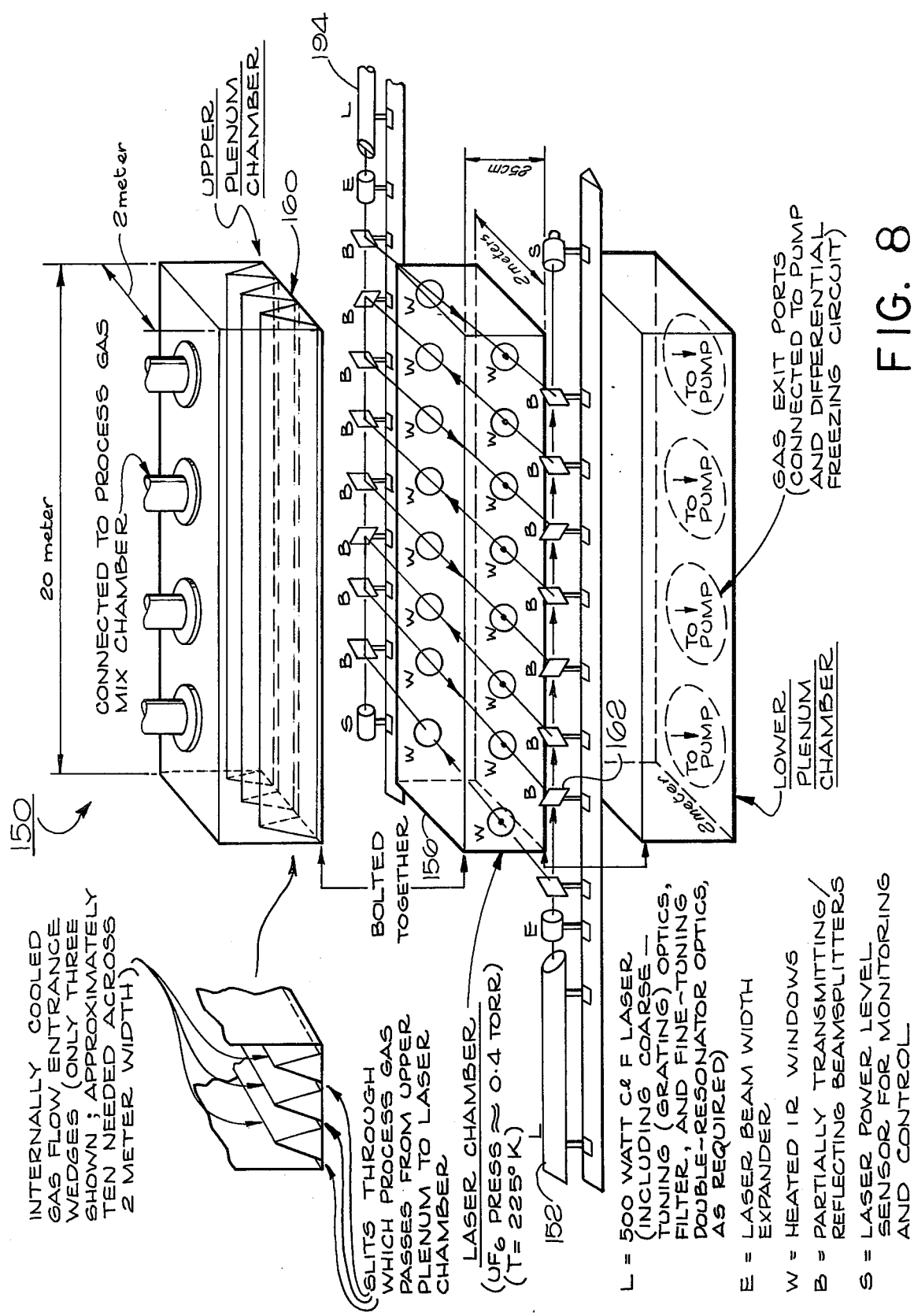

Because gas flow velocities are moderately high (hold-up time is 0.024 seconds) for the ClF laser case, a different arrangemnt 150 is shown in FIG. 8, and may be employed. In the arrangement 150 there is less hold-up length and lower flow velocities are possible. The arrangement 150 shown in FIG. 8 utilizes two 500 watt ClF lasers, 152 and 154. A 20 meter long by 2 meter wide by 25 cm high reaction chamber 156 is employed into which the ClF laser radiation is introduced through a series of windows 158 in the sides of the chamber 156. The $UF_6$ feed rate into chamber 156 from upper plenum chamber 160 for the arrangement shown in FIG. 8 is again approximately 0.2 moles/second, while the hold-up time is approximately 1.6 seconds. The increase in hold-up time attainable by the arrangement of FIG. 8 over the value of 0.024 seconds required in the tubular arrangement of FIG. 7 allows lower pumping speeds and thus, lower costs associated with pumping equipment may be realized. However this gain is offset in part by the cost of an added train of beam splitters 162 and windows 158. In practice, the choice between the arrangements 130 shown in FIG. 7 and 150 shown in FIG. 8, would depend on an economic trade-off study between the two cost factors.

Referring to FIG. 6, in operation, after the laser-induced isotope-specific reaction has occurred in the reaction chamber 110, the outgoing stream of gases in outlet manifold 113 will be composed of a mixture of gases with a typical composition of 78% HCl, 2% HF, 18% $UF_6$ and 2% $UF_5Cl$. If the laser were operated at a frequency where the isotope absorption cross-section ratio $\delta_{238}/\delta_{235} > 1$, the unreacted $UF_6$ will be enriched in $U^{235}$ and the $UF_5Cl$ will be depleted, while if the ratio $\delta_{235}/\delta_{238} > 1$, the reaction product $UF_5Cl$ will be enriched in $U^{235}$ and the $UF_6$ will be depleted. If the feed material is natural uranium (0.7% $U^{235}$), operations with $\delta_{235}/\delta_{238} > 1$ are usually preferred, since a higher effective enrichment factor can be attained for practical values of the cut $\theta$ ($\theta =$ (product $UF_5Cl$)/(Feed $UF_6$)) in a continuous process.

The processed gas mixture of $HCl/HF/UF_6/UF_5Cl$ is first compressed in compressor 180 to a pressue of about 745 Torr and temperature of 350° K and then passed through a differential freezing section 181 comprised of a series of freeze out chambers, 182, and 182′, 184 and 184′, and 186 and 186′, where each of the four components is removed by differential freezing, and the necessary piping, valves, pumps and the like for appropriate interconnection are provided as shown on FIG. 6. This is possible since each of the four gases has a different vapor pressure versus temperature curve. In FIG. 6, $UF_5Cl$ which has the lowest vapor pressure is frozen out first in chamber 182 or 182′ at a temperature of approximately 295° K and total pressure of 472 Torr. Two $UF_5Cl$ freeze-out chambers 182 and 182′ are shown in FIG. 6 to allow intermittent collection of the $UF_5Cl$ product, while laser isotope separation can go on without interruption. While one $UF_5Cl$ freeze-out chamber for example, is being discharged of collected $UF_5Cl$ product (by heating and pump-out), the other $UF_5Cl$ freeze-out chamber 182′ collects fresh $UF_5Cl$ product.

The remaining gases, $UF_6$, HCl, and HF cannot freeze out in chambers 182 or 182′ since their partial pressures are well below their vapor pressures at 295° K. Thus, they are pumped through the $UF_5Cl$ collection chambers 182 or 182′ and passed on to chambers 184 or 184′, where the next least volatile gas, namely $UF_6$, is frozen out at a temperature of approximately 222° K. As shown in FIG. 6, if a higher enrichment is desired, the $UF_6$, HCl, and HF mixture can be partially or totally refluxed to the mixture chamber and resubmitted to laser irradiation in chamber 110. In many applications, however, only a one-step enrichment is needed, or further enrichment is done in a subsequent stage, removed from the process plant shown in FIG. 6, in which case this refluxing is not necessary. Again, two chambers 184 and 184′ are shown in FIG. 6 to allow continuous operations and intermittent removal of frozen-out $UF_6$.

The gases HF and HCl are still unsaturated in chambers 184 or 184′ and thus are pumped on through to chambers 186 or 186′ where HF is frozen out at a temperature of about 175° K. Again two chambers 186 and 186′ are provided to allow continuous operations, while HF is removed and cleaned from the alternate collection chamber. The remaining HCl is finally recycled to the HCl tank 102 for reuse in the cycle.

The $UF_5Cl$ collected in chambers 182 or 182′ is depleted in $U^{235}$ if operation is selected at a condition wherein $\delta_{238}/\delta_{235} > 1$. In this case, the $UF_5Cl$ may be reformed in reformer 189 to recover depleted U, $F_2$, and $Cl_2$ as needed to balance overall operations of the uranium enrichment plant. If the operational point selected is one where $\delta_{235}/\delta_{238} > 1$, the $UF_5Cl$ is enriched in $U^{235}$ on the other hand, and may be shipped to a fuel fabrication plant as indicated at 193. The $F_2$ and $Cl_2$ are then recovered at the fuel fabrication plant and sent back to the enrichment plant for reuse.

For the $UF_6$ collected in chambers 184 and 184′, the reverse applies. That is, if the operational point selected is such that $\delta_{238}/\delta_{235} > 1$ the $UF_6$ will be enriched in $U^{235}$ and, in this case, this product is shipped to a fuel fabrication plant. If the operation point is such that $\delta_{235}/\delta_{238} > 1$, the $UF_6$ collected in chamber 184 and 184′ will be depleted in $U^{235}$, and this material will constitute the "tails" of the enrichment operation.

The HF collected in chambers 186 and 186′ may be sent to the $UF_5Cl$ reformer or to a fuel element fabrication operation where it may be used to recover Cl waste to yield HCl for recycling.

A central refrigeration plant 188 may be used, employing the coolants $CF_4(T_{freeze} = 146°$ K), Kulene - 131 ($T_{freeze} = 214°$ K) Freon-22 ($T_{freeze} = 233°$ K), and water to service the various freezing units as shown in FIG. 6.

Figure 9:
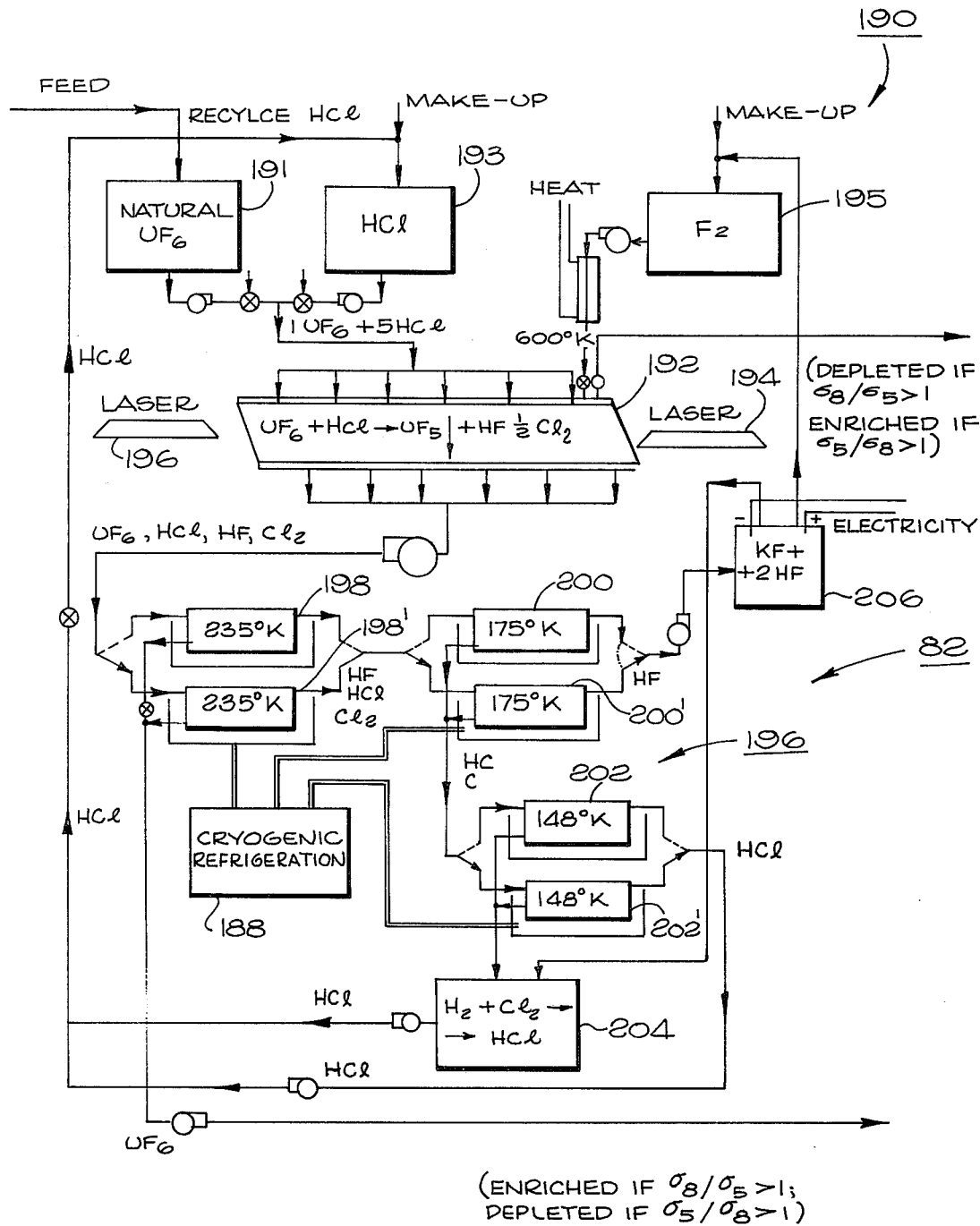
FIG. 9 is a schematic and flow diagram of an operational plant according to the principles of the present invention showing the removal of product and waste, and the recycling of unused chemicals in still another embodiment in which the product is solid isotope-enriched $UF_5$ or $UF_4$ precipitate.
Figure 10:
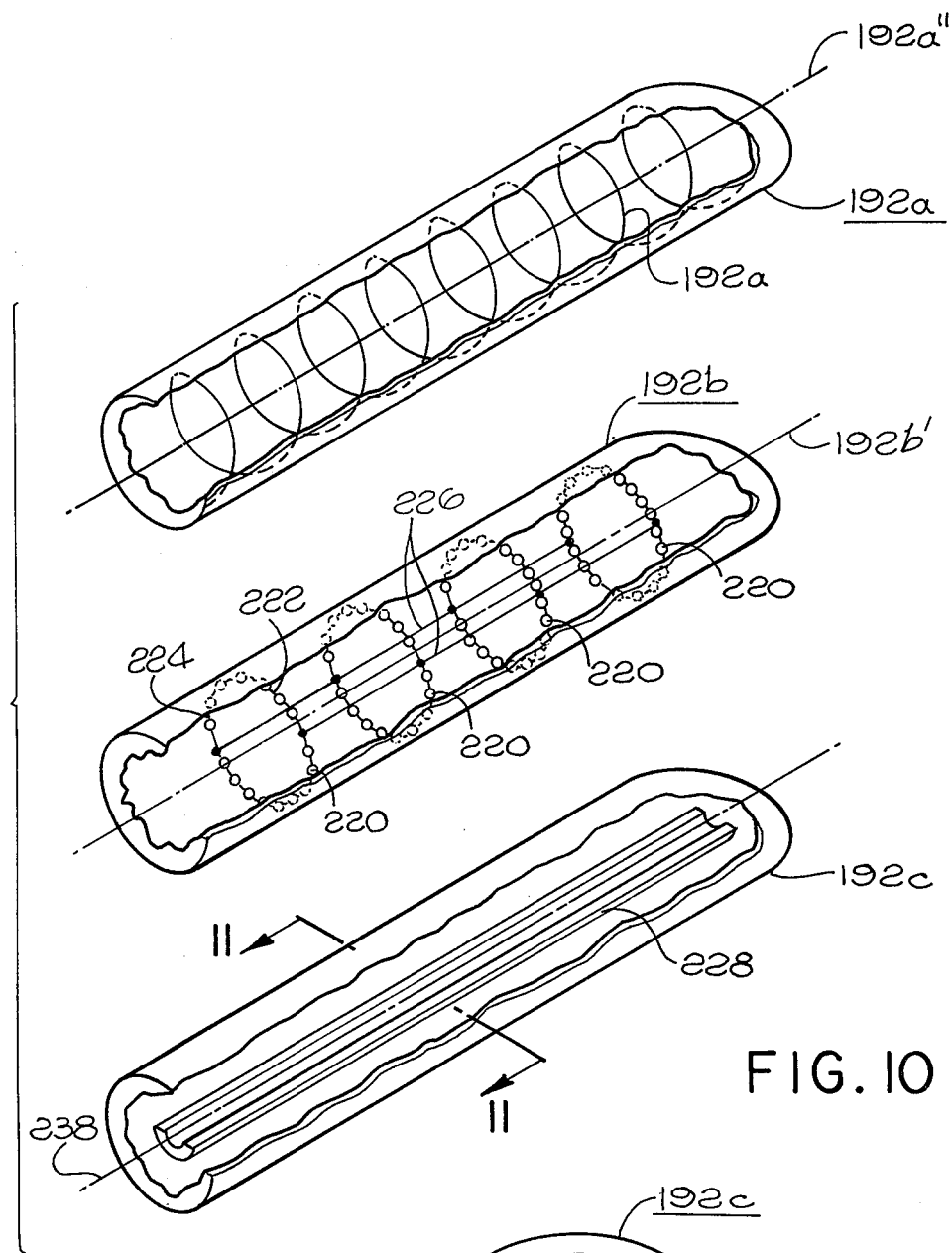
FIG. 10 and 11 show details of the disposition of catalyst in the reaction chamber used in some embodiments.

In FIG. 9, another embodiment, generally designated 190, of a processing plant in accordance with the principles of the present invention is shown, in which the reaction products $UF_5$ (or $UF_4$) + HF + ½ $Cl_2$ may be formed in addition to or in place of $UF_5Cl$ in the reaction chamber 192, which may be similar to the chamber 110, except for the presence of an additional chemically active agent of the type that is not consumed, in the form of wires, rings, beads, or chips, as shown in the reaction chambers 192a, 192b and 192c shown in FIG. 10 comprising surface-catalytic platinum, cobalt, nickel, aluminum oxide, magnesium oxide, silicon oxide, or the like, or a gaseous agent like $H_2$ or He which promote the formation of solid $UF_5$ (or $UF_4$) instead of just the product $UF_5Cl$ + HF, described above upon reaction of the laser-excited $UF_6$ with HCl.

FIG. 10 illustrates several arrangements for utilization of a surface catalyst in a reaction chamber to promote the formation of solid $UF_4$ or $UF_5$. Reaction chamber 192a, which may be utilized in the embodiment 190 shown on FIG. 9 as the reaction chamber 192, is provided with a spiral wire catalyst 192a′ therein. The spiral wire catalyst 192a′ may be comprised of the solid catalysts described above and has an axis 192a″ along which the laser beam is directed so that no interference therewith occurs.

Reaction chamber 192b may also be utilized as the reaction chamber 192 shown in FIG. 9 and is provided with a plurality of ring elements 220 in spaced relationship. Each ring element 220 is comprised of a bead holding wire means 222 having a plurality of beads 224 coupled thereto. The beads 224 may be fabricated from the solid catalysts described above. The ring elements 220 are supported in the spaced relationship within the chamber 192b by longitudinally extending wire support means 226. The laser beam is directed along the axis 192b' free of interference with ring elements 220 or supporting means 226.

Figure 11:
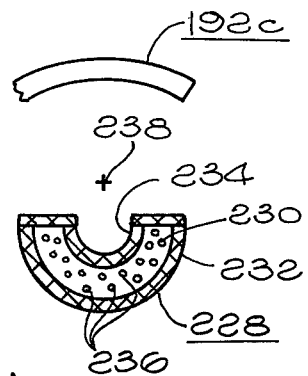

The reaction chamber 192c may also be utilized as the reaction chamber 192 shown in FIG. 9 and is provided with a semi-cylindrical, double-walled member 228 defining annular space 230 between the walls 232 and 234. Walls 232 and 234 are fabricated from a mesh or screen type material and contain a plurality of catalyst chips 236 in the annular space 230, as illustrated in FIG. 11. The chips 236 may be fabricated from the catalysts described above and the laser beam is directed along the axis 238 free of infringement upon the member 228.

In some embodiments, intermediate $UF_5Cl$ is not formed at all, and $H_2$ replaces HCl entirely in tank 193. In other embodiments, a $H_2$/HCl mixture is used in tank 193 instead of pure HCl. Excitation is provided by lasers 194 and/or 196, which may be similar to lasers 118, 132 or 134 described above. Natural $UF_6$ is supplied to chamber 192 from tank 191. The $UF_5$ ultimately formed in chamber 192 is non-volatile and precipitates out in the reaction chamber 192 as will any $UF_4$ or other solid reduction products which may be formed. The remaining volatile components $UF_6$, HCl, HF, $Cl_2$, and any residual $UF_5Cl$ (if present) are pumped out and recovered in a differential freezing section 196, similar to the section 181 shown in FIG. 6. $UF_6$ (and $UF_5Cl$ (if there is any) is frozen out and removed in chambers 198 or 198' at T = 235° K; HF is collected in chambers 200 or 200' at T = 175° K, and HCl is removed in chamber 202 or 202' at 148° K.

The remaining $Cl_2$ is passed to chemical reactor 204 where it is reacted with $H_2$ to form HCl for recycling to chamber 193. As shown in FIG. 9, the $H_2$ for this HCl recovery reaction may be obtained from cell 206 in which HF collected in chambers 200 or 200' is reacted in an electrolytic cell with KF to form $H_2$ and $F_2$. The $F_2$ produced in cell 200 is sent to storage tank 195.

In embodiments where no HCl is used at all and only pure $H_2$ is employed, no $Cl_2$ will be formed of course. The HCl removal via freezing units 202 or 202' is skipped in this case and instead of cycling $Cl_2$ to unit 204, $H_2$ gas is recycled to chamber 193.

To remove the solid $UF_5$, $UF_4$, or other solid $UF_6$-reduced products that are precipitated out in reaction chamber 192, the laser isotope separation operation is intermittently halted and $F_2$ from tank 195 is admitted to chamber 192 to refluorinate $UF_5$, $UF_4$ or other solid $UF_6$ reduction products to gaseous $UF_6$ at slightly elevated temperatures. One out of a bank of ten units 190 may be shut down at a time for example for this recovery operation.

Like in the system 82 of FIG. 8, two freeze-out chambers (198 or 198'; 200 or 200'; 202 or 202') are provided in the system 196 for the differential freezing steps that collect $UF_6$, HF, and HCl. While one chamber is being cleaned out, the other is collecting, thus allowing continuous operations, the inflow streams being switchable from one chamber to the other. Again, the $UF_6$ collected in 198 or 198' will be depleted in $U^{235}$ and the $UF_5$, $UF_4$, or other solid $UF_6$ reduction product, precipitated in 192 will be enriched in $U^{235}$, if the ratio of the absorption cross-sections $\delta_5/\delta_8$ for the laser-induced reaction process described earlier exceeds 1, while conversely the $UF_6$ collected in 198 or 198' will be enriched and the precipitate in 192 will be depleted in $U^{235}$ if the inverse ratio $\delta_8/\delta_5$ is larger than 1.

Of course, all process parameters quoted are only illustrative, and equally good or better enrichment operations may be achieved with somewhat modified values of the operating parameters and/or somewhat modified flow schemes. The schemes shown may of course be applied equally well for the separation of isotopes other than uranium. The main difference would be that other freezing temperatures must be chosen in the sequence of differential freezing operations to separate the various products, since other gaseous compounds would have other vapor pressures and freezing points. Also methods other than differential freezing, like solvent extraction, absorption, and other well-known separation techniques in chemical engineering may be employed.

From the above it can be seen that the present invention contemplates not only an improved process for effecting an enrichment of a predetermined isotope to a degree far greater than that found in a naturally occurring element, but also an improved structure for practicing the process. Those skilled in the art may find many variations and adaptations thereof and all such variations and adaptations falling within the true scope and spirit of the present invention are intended to be covered by the appended claims.

I claim:

1. In a process for obtaining a predetermined isotope by separating predetermined isotopic molecules of the predetermined isotope from a mixture of chemically identical but isotopically different molecules, to obtain an enhanced concentration of the predetermined isotopic molecules, and wherein the molecules comprising the mixture of chemically identical but isotopically different molecules have photon-inducible transitions between a lower molecular energy state of rovibrational levels and a higher molecular energy state of rovibrational levels, thereby defining a rovibrational photon absorption band, and wherein said molecules of said higher molecular energy state have a predetermined molecular vibration, and wherein said absorption band of the chemically identical but isotopically different molecules containing the predetermined isotope are frequency-shifted with respect to the absorption band of the other chemically identical but isotopically different molecules, and said absorption band having predetermined regions wherein the absorption cross-section of said predetermined isotopic molecules is larger than the absorption cross-section of the other isotopic molecules at a predetermined frequency within said predetermined region, the improvement comprising the steps of:

generating a beam of photons having a frequency corresponding to said predetermined frequency;

maintaining the mixture of chemically identical but isotopically different molecules at a predetermined pressure and a predetermined temperature;

irradiating the mixture of chemically identical but isotopically different molecules with said photons at said predetermined frequency to cause transitions of said chemically identical but isotopically different molecules to said higher molecular energy state, and said photons having a flux density to provide a rate of said transitions greater than the collisional de-excitation rate of the predetermined molecular vibration, thereby providing a population of molecules having said predetermined molecular vibration of said higher molecular energy state greater than the population of said molecules having said predetermined molecular vibration of said lower molecular energy state;

providing a chemically reactive agent to said mixture of chemically identical but isotopically different molecules, for preselected reaction therewith, and said chemically reactive agent having a reaction rate with said molecules in said higher energy state having said predetermined molecular vibration greater than the reaction rate of said agent with molecules at said lower energy state, and said reaction providing a chemical compound in a predetermined physicochemical state different from the physiocochemical state of said mixture of chemically identical but isotopically different molecules in said lower molecular energy state;

selectively removing said chemical compound; and selectively recovering said predetermined isotope.

2. The process defined in claim 1 and wherein:

said predetermined region of said absorption band comprises a substantially continuous absorption contour having a high absorption cross-section in a central portion thereof, and a low absorption cross-section less than said high absorption cross-section on slopes thereof, said isotopic frequency shift providing a difference between the magnitude of the photon absorption cross-section of the predetermined isotopic molecule and the magnitude of photon absorption cross-section of the other isotopic molecules, said difference being greater at a predetermined frequency on said slope portion than in said central portion.

3. The process defined in claim 2 wherein:

said mixture is chemically identical but isotopically different molecules comprises $UF_6$;

said predetermined isotopic molecules comprise $U^{238}F_6$ in a mixture of $U^{235}F_6$ and $U^{238}F_6$;

said predetermined absorption region comprises the envelope of Q-branches of the hot bands;

said predetermined frequency comprises a frequency on a slope portion of said Q-branches envelope intermediate the central portion of said absorption envelope and adjacent P-branches region; and the absorption cross-section of the $U^{238}F_6$ is greater than the absorption cross-section of the $U^{235}F_6$ at said predetermined frequency.

4. The process defined in claim 3 wherein:

said predetermined frequency is on said Q-branches slope in the $\nu_3$ absorption band of $UF_6$.

5. The process defined in claim 4, wherein the step of generating a beam of photons further comprises the step of inducing the emission of photons from a laser selected from the class consisting of a ClF, BrF, BCl, $SO_2$, $CO_2$ and $SF_6$ lasers.

6. The process defined in claim 3 wherein:

said predetermined frequency is on said Q-branches slope in the $(\nu_1 + \nu_3)$ absorption band of $UF_6$.

7. The process as defined in claim 6, wherein the step of generating a beam of photons further comprises the step of inducing the emission of photons from a BF laser.

8. The process defined in claim 3 wherein:

said predetermined frequency is on said Q-branches slopein the $(\nu_2 + \nu_3)$ absorption band of $UF_6$.

9. The process as defined in claim 8, wherein the step of generating a beam of photons further comprises the step of inducing the emission of photons from a laser selected from the class consisting of $O^{18}C^{12}S^{36}$, $O^{18}C^{13}S^{36}$, $O^{18}C^{12}S^{36}$, $O^{18}C^{12}S^{34}$, $O^{16}C^{12}S^{36}$, CS, and BF lasers.

10. The process defined in claim 3 wherein:

said predetermined frequency is on said Q-branches slope in the $(\nu_3 + \nu_5)$ absorption band of $UF_6$.

11. The process defined in claim 3 wherein:

said predetermined frequency is on said Q-branches slope in the $3\nu_3$ absorption band of $UF_6$.

12. The process defined in claim 11, wherein said step of generating a beam of photons further comprises the step of inducing the emission of a CO laser.

13. The process defined in claim 3 wherein:

said predetermined frequency is on said Q-branches slope in the $(\nu_3 + \nu_4 + \nu_6)$ absorption band of $UF_6$.

14. The process defined in claim 13, wherein the step of generating a beam of photons further comprises the step of inducing the emission of photons from a $CO_2$ laser.

15. The process defined in claim 2, wherein:

said predetermined pressure is in the range of 0.01 and 760 Torr.

16. The process defined in claim 2 wherein:

said mixture of chemically identical but isotopically different molecules comprises $UF_6$;

said predetermined isotopic molecules comprise $U^{235}F_6$ in a mixture of $U^{235}F_6$ and $U^{238}F_6$;

said predetermined absorption region comprises the envelope of Q-branches of the hot bands;

said predetermined frequency comprises a frequency on a slope portion of said Q-branches envelope intermediate the central portion of said Q-branches envelope and adjacent hot R-branches region; and the absorption cross-section of the $U^{235}F_6$ is greater than the absorption cross-section of the $U^{238}F_6$ at said predetermined frequency.

17. The process defined in claim 16 wherein:

said predetermined frequency is on said Q-branches slope in the $\nu_3$ absorption band of $UF_6$.

18. The process defined in claim 17, wherein the step generating a beam of photons further comprises the step of inducing the emission of photons from a laser selected from the class consisting of a ClF, BrF, BCl, $SO_2$, $CO_2$ and $SF_6$ lasers.

19. The process defined in claim 16, wherein:

said predetermined frequency is on said Q-branches slope in the $(\nu_1 + \nu_3)$ absorption band of $UF_6$.

20. The process defined in claim 19, wherein the step of generating a beam of photons further comprises the step of inducing the emission of photons from a BF laser.

21. The process defined in claim 16 wherein:

said predetermined frequency is on said Q-branches slope in the $(\nu_2 + \nu_3)$ absorption band of $UF_6$.

22. The process defined in claim 21, wherein the step of generating a beam of photons further comprises the step of inducing the emission of photons from a laser selected from the class consisting of $O^{16}C^{13}S^{34}$, $O^{18}C^{12}S^{32}$, $O^{18}C^{12}S^{34}$, CS, and BF lasers.

23. The process defined in claim 16 wherein:

said predetermined frequency is on said Q-branches slope in the $(\nu_3 + \nu_5)$ absorption band of $UF_6$.

24. The process defined in claim 16 wherein:

said predetermined frequency is on said Q-branches slope in the $3\nu_3$ absorption band of $UF_6$.

25. The process defined in claim 24, wherein said step of generating a beam of photons further comprises the step of inducing the emission of a CO laser.

26. The process defined in claim 16 wherein:
said predetermined frequency is on said Q-branches slope in the $(\nu_3 + \nu_4 + \nu_6)$ absorption band of $UF_6$.

27. The process defined in claim 26, wherein the step of generating a beam of photons further comprises the step of inducing the emission of photons from a $CO_2$ laser.

28. The process as defined in claim 16, wherein:
said preselected reaction is the dissociation of $UF_6$ into at least one of $UF_5$ and $UF_4$ solid reduction products; and further comprising the step of:
intermittently removing said solid reduction products.

29. The process as defined in claim 28, wherein:
said transitions of said chemically identical but isotopically different molecules are induced by multiphoton absorption; and
said step of generating a beam of photons further comprising the steps of inducing the emission of photons from a focused laser.

30. The process as defined in claim 29 and further comprising the step of:
pulsing said laser.

31. The process as defined in claim 28, wherein:
the chemically reactive agent is selected from the class consisting of gaseous hydrogen and helium.

32. The process as defined in claim 28, wherein:
the chemically reactive agent is a surface-active catalyst selected from the class consisting of platinum, nickel, aluminum oxide and magnesium oxide, and said surface-active catalyst is in a form selected from the class of wires, chips, and rings.

33. The process as defined in claim 28, further comprising the step of cooling a preselected portion of said reaction chamber, and said solid reduction products are precipitated in said cooled portion of said reaction chamber, and intermittently removing said solid precipitate product from said reaction chamber.

34. The process as defined in claim 33, and further comprising the steps of:
continuously supplying said mixture of chemically identical but isotopically different molecules to said reaction chamber; and
continuously removing said unreacted and other gaseous products from said reaction chamber.

35. The process as defined in claim 33, and further comprising the steps of:
intermittently supplying said mixture of chemically identical but isotopically different molecules to said reaction chamber; and
intermittently removing the unreacted and other gaseous products from the reaction chamber.

36. The process as defined in claim 28, wherein:
said step of intermittent solid product removal further comprises the steps of refluorination and regasification of the solid reduction product to reform gaseous $UF_6$, and pumping said reformed gaseous $UF_6$ from said reaction chamber.

37. The process defined in claim 1, wherein:
said absorption band comprises at least one continuous, solid hot Q-branches contour in said central portion of said absorption band, and having structured regions of hot P-branches and R-branches adjacent thereto containing a plurality of high absorption peaks and low absorption holes, and said predetermined region of said absorption band comprises said structured regions of said hot P-branches and R-branches containing said plurality of said high absorption peaks and low absorption holes;
said predetermined frequency is a frequency where at least one of said high absorption peaks of the predetermined isotopic molecule coincides with a low absorption hole of the other isotopic molecules.

38. The process defined in claim 37, wherein:
said mixture of chemically identical but isotopically different molecules comprises $UF_6$;
said predetermined isotopic molecules comprise $U^{235}F_6$ in a mixture of $U^{235}F_6$ and $U^{238}F_6$;
said predetermined frequency is in at least one of said P-branches and R-branches region of the $\nu_3$ absorption band of $UF_6$;
the absorption cross-section of $U^{235}F_6$ is greater than the absorption cross-section of $U^{238}F_6$ at said predetermined frequency.

39. The process defined in claim 38, wherein the step of generating a beam of photons further comprises the step of inducing the emission of photons from a laser selected from the class consisting of a ClF, BrF, BCl and $SO_2$, $CO_2$ and $SF_6$ lasers.

40. The process defined in claim 38, wherein:
said preselected reaction is the dissociation of $UF_6$ into at least one of $UF_5$ and $UF_4$ solid reduction products; and further comprising the step of:
intermittently removing said solid reduction products.

41. The process as defined in claim 40, wherein:
the chemically reactive agent is selected form the class consisting of gaseous hydrogen and helium.

42. The process as defined in claim 40, wherein:
the chemically reactive agent is a surface-active catalyst selected from the class consisting of platinum, nickel, aluminum oxide and magnesium oxide, and said surface-active catalyst is in a form selected form the class of wires, chips, and rings.

43. The process as defined in claim 40, wherein:
said transitions of said chemically identical but isotopically different molecules are induced by multiphoton absorption; and
said step of generating a beam of photons further comprising the steps of inducing the emission of photons from a focused laser.

44. The process as defined in claim 43 and further comprising the step of:
pulsing said laser.

45. The process defined in claim 37, wherein:
said mixture of chemically identical but isotopically different molecules comprises $UF_6$;
said predetermined isotopic molecules comprise $U^{238}F_6$ in a mixture of $U^{235}F_6$ and $U^{238}F_6$;
said predetermined frequency is in at least one of said P-branches and R-branches region of the $\nu_3$ absorption band of $UF_6$; and
the absorption cross-section of $U^{238}F_6$ is greater than the absorption cross-section of $U^{235}F_6$ at said predetermined frequency.

46. The process defined in claim 45, wherein the step of generating a beam of photons further comprises the step of inducing the emission of photons from a laser selected from the class consisting of a ClF, BrF, BCl, $SO_2$, $CO_2$ and $SF_6$ lasers.

47. The process defined in claim 37, wherein:

said predetermined pressure is in the range of 0.01 and 10 Torr.

48. The process defined in claim 37, wherein:
said mixture of chemically identical but isotopically different molecules comprises $UF_6$;
said predetermined isotopic molecules comprise $U^{235}F_6$ in a mixture of $U^{235}F_6$ and $U^{238}F_6$;
said predetermined frequency is in at least one of said P-branches and R-branches region of a combination vibrational absorption band of $UF_6$ comprised of a plurality normal vibrations and at least one of said normal vibrations is the $\nu_3$ vibration;
the absorption cross-section of $U^{235}F_6$ is greater than the absorption cross-section of $U^{238}F_6$ at said predetermined frequency.

49. The process defined in claim 37, wherein:
said mixture of chemically identical but isotopically different molecules comprises $UF_6$;
said predetermined isotopic molecules comprise $U^{238}F_6$ in a mixture of $U^{235}F_6$ and $U^{238}F_6$:
said predetermined frequency is in at least one of said P-branches and R-branches region of a combination vibrational absorption band of $UF_6$ comprised of a plurality normal vibrations and at least one of said normal vibrations is the $\nu_3$ vibration;
the absorption cross-section of $U^{238}F_6$ is greater than the absorption cross-section of $U^{235}F_6$ at said predetermined frequency.

50. The process defined in claim 1, wherein:
said predetermined molecular vibration is the $\nu_3$ vibration.

51. The process defined in claim 1, wherein:
the steps of selectively removing said chemical compound and selectively recovering said predetermined isotope further comprises the steps of differential freezing of the chemical compound, the unreacted chemically identical but isotopically different molecules and unreacted chemically reactive agent to separate the constituents thereof.

52. The process defined in claim 1, wherein:
said mixture of chemically identical but isotopically different molecules is provided with said chemically reactive agent in a mole-ratio in a range between 1 to 1 and 1 to 20 parts chemically identical but isotopically different molecules to chemically reactive agent.

53. The process defined in claim 52, wherein:
the chemically reactive agent is selected from the class consisting of hydrogen chloride, hydrogen bromide and mixtures of hydrogen and hydrogen chloride, hydrogen and hydrogen bromide, hydrogen chloride and hydrogen bromide, and hydrogen, hydrogen chloride and hydrogen bromide.

54. The process defined in claim 52, wherein:
said mixture of chemically identical but isotopically different molecules comprises $UF_6$, said chemically reactive agent is hydrogen chloride, and said chemical reaction is one of an exothermic and thermoneutral reaction of $UF_6$ with hydrogen chloride producing gaseous $UF_5Cl$ and gaseous HF, and in which said HF is in one of the ground and excited vibrational levels.

55. The process defined in claim 52, wherein:
said mixture of chemically identical but isotopically different molecules comprises $UF_6$, said chemically reactive agent is hydrogen bromide, and said chemical reaction is one of an exothermic and thermoneutral reaction of $UF_6$ with hydrogen bromide producing gaseous $UF_5Br$ and gaseous HF and in which said HF is in one of the ground and excited vibrational levels.

56. The process defined in claim 52, wherein:
said mixture of chemically identical but isotopically different molecules comprises $UF_6$, said chemically reactive agent is a mixture of hydrogen, hydrogen chloride, and hydrogen bromide, and said chemical reaction produces $UF_5Cl$, $UF_5Br$, and HF.

57. The process defined in claim 1, wherein:
the chemically reactive agent is selected from the class consisting of hydrogen chloride, hydrogen bromide and mixtures of hydrogen and hydrogen chloride, hydrogen and hydrogen bromide, hydrogen chloride and hydrogen bromide, and hydrogen, hydrogen chloride and hydrogen bromide.

58. The process defined in claim 1, wherein:
said mixture of chemically identical but isotopically different molecules comprises $UF_6$, said chemically reactive agent is hydrogen chloride, and said chemical reaction is one of an exothermic and thermoneutral reaction of $UF_6$ with hydrogen chloride producing gaseous $UF_5Cl$ and gaseous HF. and in which said HF is in one of the ground and excited vibrational levels.

59. The process defined in claim 1, wherein:
said mixture of chemically identical but isotopically different molecules comprises $UF_6$, said chemically reactive agent is hydrogen bromide, and said chemical reaction is one of an exothermic and thermoneutral reaction of $UF_6$ with hydrogen bromide producing gaseous $UF_5Br$ and gaseous HF and in which said HF is in one of the ground and excited vibrational levels.

60. The process defined in claim 1, wherein:
said mixture of chemically identical but isotopically different molecules comprises $UF_6$, said chemically reactive agent is a mixture of hydrogen, hydrogen chloride, and hydrogen bromide, and said chemical reaction produces $UF_5Cl$, $UF_5Br$, and HF.

61. The process defined in claim 1, wherein:
said predetermined temperature is in the range of 100° to 300° Kelvin.

62. The process as defined in claim 1, and further comprising the steps of:
retaining said mixture of chemically identical but isotopically different molecules and reactive agent in a reaction chamber for a predetermined hold-up time;
said steps of selectively removing said chemical compound and selectively recovering said predetermined isotope further comprises the step of removing the contents of said reaction chamber and subjecting said contents to a sequence of differential freezing chambers maintained at preselected different temperatures wherein each chemical species having a different freezing point is successively frozen out, collected, and separated; and
said hold-up time in said reaction chamber is selected to provide said chemical reaction of approximately 5% to 99% of the preselected isotopic molecules.

63. The process defined in claim 62, wherein:
said reaction chamber has an optical path length to said photons having said predetermined frequency to provide approximately 10% to 99% of said photons absorbed by said mixture of chemically identical but isotopically different molecules.

64. The process defined in claim 62, wherein:

said mixture of chemically identical but isotopically different molecules and reactive agent are continuously supplied to said reaction chamber, and chemical product and unreacted components are continuously pumped out of said reaction chamber.

65. The process defined in claim 62, wherein:

said mixture of chemically identical but isotopically different molecules and reactive agent are intermittently supplied to said reaction chamber in predetermined mixed amounts and said chemical product and unreacted components are intermittently removed from said reaction chamber to provide a batch feed and batch removal process.

66. In an isotope separation arrangement of the type having photon induced transitions at a predetermined frequency of at least one isotopic molecule of a medium comprised of a mixture of chemically identical but isotopically different molecules, the improvement comprising:

a laser means for generating a beam of photons having energy at said predetermined frequency, and said laser means further comprising:
  a coupled, two-legged optical laser resonator means having:
    a short leg having a variable length, and
    a long leg;
a grating means for coarse tuning the frequency at the photons contained in said beam of photons;
control means connected to said short leg for varying the length thereof;
whereby variations in said length of said short leg within a predetermined range of lengths provides fine tuning at the frequency of the photons in said beam of photons.

67. The arrangement defined in claim 66 further comprising:

said control means for varying said length of said short leg comprising:
detector means for detecting variations in the frequency of said photons and generating a first control signal in response thereto;
a piezo-electric micro-positioning means for receiving said first control signal and varying said length of said short leg in response thereto.

68. The arrangement defined in claim 66, further comprising:

a long leg oscillation means for cyclically varying the length of said long leg at a frequency of at least 50 Hz and at an oscillation amplitude of at least as small as half the wavelength of said photons in said beam of photons, and said oscillation means further comprises:
  a piezo-electric micro-positioning means connected to said long leg;
  means for applying a voltage input to said micro-positioning means; and
  means for cyclically varying the magnitude of said voltage input.

69. The arrangement defined in claim 66 and further comprising:

a reaction chamber for containing said medium comprised of said mixture of chemically identical but isotopically different molecules;
said laser further comprises a pair of end mirrors; and
said reaction chamber is positioned between said end mirrors of said laser; and
said at least one isotopic molecule comprises a molar concentration in said medium of less than approximately 2%.

70. In an isotope separation arrangement of the type having photon induced transitions at a predetermined frequency of at least one isotopic molecule of a medium comprised of a mixture of chemically identical but isotopically different molecules, the improvement comprising:

a laser means for generating a beam of photons having energy at said predetermined frequency, and said laser means further comprising:
  a pair of end mirrors;
  a filter cell means positioned between said pair of end mirrors;
  a medium contained in said filter cell and said medium comprising a collection of said isotopic molecules and substantially free of said at least one isotopic molecule whereby the generation of photons having frequencies other than said predetermined frequency is suppressed.

71. The process as defined in claim 1, wherein:

said chemically reactive agent is substantially free of strong absorption of said photons at said predetermined frequency.

72. The process defined in claim 1 wherein the chemically reactive agent is selected from the class consisting of hydrogen chloride, hydrogen bromide, hydrogen, and any mixture of hydrogen chloride, hydrogen bromide, and hydrogen.

* * * * *